(12) United States Patent
Chung et al.

(10) Patent No.: US 11,503,364 B2
(45) Date of Patent: Nov. 15, 2022

(54) DISPLAY APPARATUS, CONTROL METHOD THEREOF, AND RECORDING MEDIUM

(71) Applicant: SAMSUNG ELECTRONICS CO., LTD., Suwon-si (KR)

(72) Inventors: Jin Joo Chung, Suwon-si (KR); Woo Seok Kang, Suwon-si (KR); Doo Hyun Kim, Suwon-si (KR); Sang Kwon Na, Suwon-si (KR); Chul Woo Lee, Suwon-si (KR); Doo Chan Hwang, Suwon-si (KR); Ki Won Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/765,334

(22) PCT Filed: Oct. 24, 2018

(86) PCT No.: PCT/KR2018/012668
§ 371 (c)(1),
(2) Date: May 19, 2020

(87) PCT Pub. No.: WO2019/117451
PCT Pub. Date: Jun. 20, 2019

(65) Prior Publication Data
US 2020/0359083 A1    Nov. 12, 2020

(30) Foreign Application Priority Data

Dec. 12, 2017 (KR) .......................... 10-2017-0170190

(51) Int. Cl.
*H04N 21/4363* (2011.01)
*H04N 21/422* (2011.01)
(Continued)

(52) U.S. Cl.
CPC . *H04N 21/43635* (2013.01); *H04N 21/42204* (2013.01); *H04N 21/431* (2013.01); *H04N 21/4367* (2013.01)

(58) Field of Classification Search
CPC ....... H04N 21/43635; H04N 21/42204; H04N 21/431
(Continued)

(56) References Cited

U.S. PATENT DOCUMENTS 8,447,070 B1    5/2013  Bozarth et al.
2009/0228820 A1 9/2009  Kim et al.
(Continued)

FOREIGN PATENT DOCUMENTS

CN    102884537 A    1/2013
CN    102999251 A    3/2013
(Continued)

OTHER PUBLICATIONS

Communication dated Jul. 9, 2020 issued by the European Patent Office in European Application No. 18887329.3.
(Continued)

*Primary Examiner* — John W Miller
*Assistant Examiner* — Omer Khalid
(74) *Attorney, Agent, or Firm* — Sughrue Mion, PLLC

(57) ABSTRACT

A display apparatus, a control method thereof and a recording medium are provided. The display apparatus includes: a display; a communicator configured to communicate with at least one external apparatus; and a processor configured to: control a user interface (UI) to be displayed on the display, the UI including a first item corresponding to the display apparatus and a second item corresponding to the at least one external apparatus and being displayed to distinguish between an external apparatus connected to the display apparatus and an external apparatus disconnected from the
(Continued)

display apparatus, and, based on one of at least one of the second item being selected, control the external apparatus corresponding to the selected item to be connected to or disconnected from the display apparatus through the communicator.

15 Claims, 14 Drawing Sheets

(51) Int. Cl.
*H04N 21/431* (2011.01)
*H04N 21/4367* (2011.01)

(58) Field of Classification Search
USPC .................................. 348/734, 552, 553, 739
See application file for complete search history.

(56) References Cited

U.S. PATENT DOCUMENTS

| | | | |
|---|---|---|---|
| 2011/0037851 | A1 | 2/2011 | Kim et al. |
| 2011/0117938 | A1* | 5/2011 | Pyo ...................... H04W 64/00 455/457 |
| 2012/0144347 | A1 | 6/2012 | Jo et al. |
| 2013/0106738 | A1 | 5/2013 | Kim et al. |
| 2013/0107022 | A1 | 5/2013 | Shintani |
| 2015/0089371 | A1 | 3/2015 | Zaslavsky et al. |
| 2016/0081135 | A1 | 3/2016 | Kang et al. |
| 2016/0117076 | A1 | 4/2016 | Kim et al. |
| 2016/0360048 | A1* | 12/2016 | Yasu ...................... G06V 20/00 |
| 2017/0134553 | A1 | 5/2017 | Jeon et al. |
| 2017/0193962 | A1* | 7/2017 | Yoon ...................... H04N 5/44 |
| 2017/0237931 | A1 | 8/2017 | Lee et al. |
| 2017/0289329 | A1 | 10/2017 | Yim et al. |
| 2017/0315715 | A1* | 11/2017 | Fujita .................. G06F 3/04886 |

FOREIGN PATENT DOCUMENTS

| | | |
|---|---|---|
| CN | 105245925 A | 1/2016 |
| CN | 107005750 A | 8/2017 |
| CN | 107040646 A | 8/2017 |
| EP | 2501143 A2 | 9/2012 |
| EP | 3240296 A1 | 11/2017 |
| KR | 10-1012300 B1 | 2/2011 |
| KR | 10-2012-0063328 A | 6/2012 |
| KR | 10-1467796 B1 | 12/2014 |
| KR | 10-1575991 B1 | 12/2015 |
| KR | 10-2016-0035535 A | 3/2016 |
| KR | 10-2016-0041285 A | 4/2016 |
| KR | 10-2017-0022074 A | 3/2017 |

OTHER PUBLICATIONS

International Search Report (PCT/ISA/210) dated Feb. 15, 2019 issued by the International Searching Authority in counterpart International Application No. PCT/KR2018/012668.
Written Opinion (PCT/ISA/237) dated Feb. 15, 2019 issued by the International Searching Authority in counterpart International Application No. PCT/KR2018/012668.
Communication dated Jul. 21, 2021, issued by the European Patent Office in European Application No. 18887329.3.
Communication dated Nov. 24, 2021 by the Chinese Patent Office in Chinese Patent Application No. 201880079789.0.
Communication dated Nov. 30, 2021 by the Korean Patent Office in Korean Patent Application No. 10-2017-0170190.
Communication dated Mar. 31, 2022 by the European Patent Office in European Patent Application No. 18887329.3.
Communication dated Apr. 26, 2022 by Intellectual Property India in Indian Patent Application No. 202017021965.
Communication dated Jun. 20, 2022 by the China National Intellectual Property Administration in Chinese Patent Application No. 201880079789.0.

* cited by examiner

DISPLAY APPARATUS, CONTROL METHOD THEREOF, AND RECORDING MEDIUM

TECHNICAL FIELD

The disclosure relates to a display apparatus, a control method thereof and a recording medium, and more particularly to a display apparatus, in which a network communication with an external apparatus is possible, a control method thereof and a recording medium.

BACKGROUND ART

A television (TV) or the like display apparatus connects with various external apparatuses including a set-top box; a player for an optical disc such as a Blu-ray disc (BD), a digital versatile disc (DVD), etc.; an audio/video receiver; a game console; a terminal such as a smartphone or a tablet computer, etc. by a wire or wirelessly. Through menu selection, a user can check the apparatuses that have been connected to the display apparatus or the apparatuses that are connectable to the display apparatus.

Typically, the display apparatus simply displays a list of connected apparatuses or connectable apparatuses through a screen. Further, when a plurality of apparatuses are connected or connectable to the display apparatus, they are generally displayed as distinguished by their model names.

Therefore, information a user can receive through the screen is very limited, and it is inconvenient to grasp at a glance connection status between the display apparatus and the external apparatus.

DISCLOSURE

Technical Problem

The disclosure is conceived to solve the above-described problems and provides a display apparatus, a control method thereof and a recording medium, in which connection information between the display apparatus and an external apparatus is displayed through a screen so as to be easily recognizable by a user.

Further, the disclosure is to provide a display apparatus, a control method thereof and a recording medium, which are convenient for a user to connect or disconnect an external apparatus to or from the display apparatus by simple control based on connection information displayed on a screen.

Technical Solution

According to an embodiment of the disclosure a display apparatus includes: a display; a communicator configured to communicate with at least one external apparatus; and a processor configured to: control a user interface (UI) to be displayed on the display, the UI including a first item corresponding to the display apparatus and a second item corresponding to the at least one external apparatus and being displayed to distinguish between an external apparatus connected to the display apparatus and an external apparatus disconnected from the display apparatus, and based on one of at least one of the second item being selected, control the external apparatus corresponding to the selected item to be connected to or disconnected from the display apparatus through the communicator. Thus, the external apparatus connected to the display apparatus and the external apparatus disconnected from the display apparatus are displayed to be distinguished from each other at a glance, and an easy user input is enough to set or release connection of a specific apparatus.

The UI may be displayed to position the second item of the connected external apparatus adjacent to the first item, and be displayed to position the second item of a disconnected external apparatus farther from the first item than the second item of the connected external apparatus. Thus, it is easier for a user to distinguish between the connected apparatus and the disconnected apparatus.

The display apparatus may further include a user input receiver, and the processor may be configured to: based on a user input for moving the second item of a disconnected external apparatus close to the first item, control the disconnected external apparatus of the moved second item to be connected to the display apparatus; or based on a user input for moving the second item of a connected external apparatus away from the first item, control the connected external apparatus of the moved second item to be disconnected from the display apparatus. Thus, an easy user input based on Drag is enough to easily set or release the connection of the external apparatus.

The processor may control the communicator to transmit the identification information of the first external apparatus to the second external apparatus, and transmit the identification information of the second external apparatus to the first external apparatus, so that the first and second external apparatuses can be connected to each other. Thus, it is more convenient for a user because the communication between the external apparatuses is automatically set.

The UI may be displayed with the second items of connected external apparatuses to distinguish between the corresponding external apparatus that is being currently connected and the corresponding external apparatus that has been connected before. Thus, it is possible to immediately grasp a usable apparatus.

The UI may further include information about status of the external apparatus, and be displayed with at least one of a shape, color, or text of the second item to distinguish at least one of the kind, model name or user of the corresponding external apparatus. Thus, it is possible to effectively provide necessary information to a user by various methods.

The UI may be displayed with the second item to represent a position of the external apparatus with respect to the display apparatus. Thus, it is advantageously easy for a user to distinguish between the external apparatuses even though a plurality of same kind of apparatuses is displayed.

The UI may be displayed with a plurality of second items respectively corresponding to a plurality of external apparatuses to distinguish between connection and disconnection between the plurality of external apparatuses. Thus, it is possible to integrally manage communication connection status of peripheral apparatuses centering around the display apparatus.

The display apparatus may further include a user input receiver, and the processor may be configured to control a first external apparatus and a second external apparatus to be connected to each other, based on a user input for moving the second items corresponding to the first and second external apparatuses among the plurality of second items close to each other. Thus, the connection between the peripheral apparatuses is set or released by an easy user input.

When a user input is made to select two or more second items among a plurality of second items, the processor may control the two or more corresponding external apparatuses to be connected to or disconnected from each other. Thus, it is more convenient to manage the peripheral apparatuses through a main apparatus.

Meanwhile, according to an embodiment of the disclosure, a method of controlling a display apparatus includes: detecting a predetermined event related to at least one external apparatus capable of communicating with the display apparatus; displaying a user interface (UI) with a first item corresponding to the display apparatus and a second item corresponding to the at least one external apparatus to distinguish between an external apparatus connected to the display apparatus and an external apparatus disconnected from the display apparatus, based on the event; receiving a user input for selecting one of at least one of the second item; and controlling the external apparatus corresponding to the selected item to be connected to or disconnected from the display apparatus. Thus, Thus, the external apparatus connected to the display apparatus and the external apparatus disconnected from the display apparatus are displayed to be distinguished from each other at a glance, and an easy user input is enough to set or release connection of a specific apparatus.

The UI may be display with the second item of a disconnected external apparatus to be farther from the first item than the second item of the connected external apparatus. Thus, it is easier for a user to distinguish between the connected apparatus and the disconnected apparatus.

The method may further include: based on a user input for moving the second item of a disconnected external apparatus close to the first item, controlling the disconnected external apparatus of the moved second item to be connected to the display apparatus; or based on a user input for moving the second item of a connected external apparatus away from the first item, controlling the connected external apparatus of the moved second item to be disconnected from the display apparatus.

The method may further include, based on a user input for moving the second item of the disconnected external apparatus to the second item of the connected external apparatus, or moving the second item of the connected external apparatus to the second item of the disconnected external apparatus, controlling the disconnected the external apparatus to be connected to the display apparatus, and the connected external apparatus to be disconnected from the display apparatus. Thus, it is more convenient for a user because both the connection and the disconnection between the two apparatuses are carried out by one user input of swapping the UI positions.

The UI may be displayed with the second items of connected external apparatuses to distinguish between the corresponding external apparatus that is being currently connected and the corresponding external apparatus that has been connected before. Thus, it is possible to immediately grasp a usable apparatus.

The UI may further include information about status of the external apparatus. Thus, it is possible to effectively provide necessary information to a user by various methods.

The UI may be displayed with a plurality of second items respectively corresponding to a plurality of external apparatuses to distinguish between connection and disconnection between the plurality of external apparatuses, and the method may further include, based on a user input for moving the second items corresponding to the first and second external apparatuses among the plurality of second items close to each other, controlling a first external apparatus and a second external apparatus to be connected to each other. Thus, it is possible to integrally manage communication connection status of peripheral apparatuses centering around the display apparatus, and the connection between the peripheral apparatuses is set or released by an easy user input.

The controlling the first and second external apparatuses to be connected to each other may include transmitting the identification information of the first external apparatus to the second external apparatus, and transmitting the identification information of the second external apparatus to the first external apparatus. Thus, it is more convenient for a user because the communication between the external apparatuses is automatically set.

Meanwhile, according to an embodiment of the disclosure, there is provided a computer-readable nonvolatile recording medium, recorded with a program of a method executable by the processor of the display apparatus, the method including: detecting a predetermined event related to at least one external apparatus capable of communicating with the display apparatus; displaying a user interface (UI) with a first item corresponding to the display apparatus and a second item corresponding to the at least one external apparatus to distinguish between an external apparatus connected to the display apparatus and an external apparatus disconnected from the display apparatus, based on the event; receiving a user input for selecting one of at least one of the second item; and controlling the external apparatus corresponding to the selected item to be connected to or disconnected from the display apparatus. Thus, Thus, the external apparatus connected to the display apparatus and the external apparatus disconnected from the display apparatus are displayed to be distinguished from each other at a glance, and an easy user input is enough to set or release connection of a specific apparatus.

Advantageous Effects

In a display apparatus, a control method thereof and a recording medium as described above according to the disclosure, items respectively corresponding to an external apparatus connected to the display apparatus and an external apparatus disconnected from the display apparatus are displayed within one screen as distinguished with their status information, so that a user can easily grasp at a glance connection status between the external apparatuses.

Further, a display apparatus, a control method thereof and a recording medium according to the disclosure are more convenient for a user to connect or disconnect an external apparatus to or from the display apparatus by simple control of selecting a displayed item.

REFERENCE NUMERALS

| | |
|---|---|
| 100: display apparatus | 110: image receiver |
| 120: image processor | 130: display |
| 140: user input receiver | 150: communicator |
| 160: storage | 170: controller |
| 200, 201, 202, 203, 204: external apparatus | |

BEST MODE

Below, exemplary embodiments will be described in detail with reference to accompanying drawings. Further, the descriptions of the embodiments will be made with matters illustrated in the accompanying drawings, in which like numerals or symbols refer to like elements having substantially the same function.

At least one among a plurality of elements in the present disclosure represents not only all the elements but also each one of the elements, which precludes the other elements, or all combinations of the elements.

Figure 1:
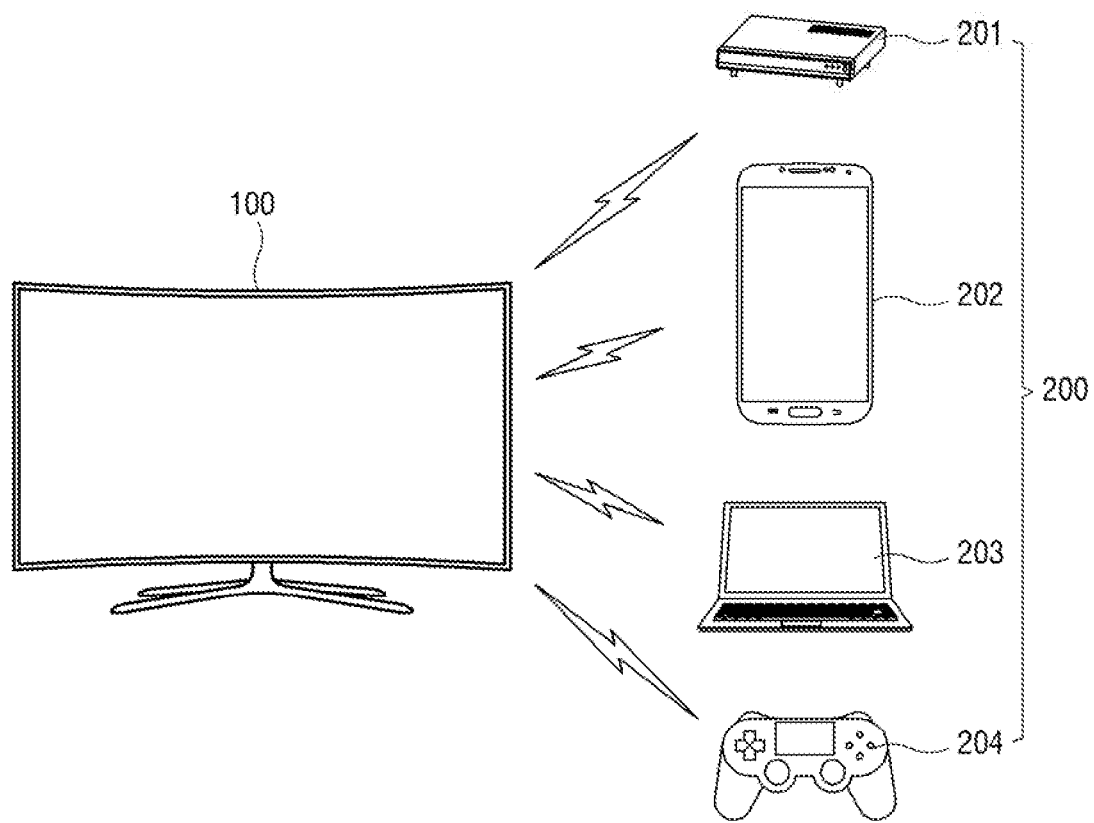
FIG. 1 illustrates a display system according to an embodiment of the disclosure.

FIG. 1 illustrates a display system according to an embodiment of the disclosure.

As shown in FIG. 1, a system according to an embodiment of the disclosure includes a display apparatus 100, and at least one external apparatus 200.

The display apparatus 100 processes an image signal, which is received from an external image source (not shown), with a preset image processing process, and displays an image. According to an embodiment, as shown in FIG. 1, the display apparatus 100 may be embodied by a television (TV) that processes a broadcast image based on a broadcast signal/broadcast information/broadcast data received from a transmitter of a broadcasting station. The broadcast signal received in the display apparatus 100 may be received through a terrestrial wave, a cable, a satellite, etc., and an image source in this embodiment is not limited to the broadcasting station. That is, any apparatus or station capable of transmitting and receiving data may be included in the image source according to the exemplary embodiment.

Further, the display apparatus 100 may receive an image signal from various types of external apparatus 200. Further, the display apparatus 100 may process a signal to be displayed on a screen as a moving image, a still image, an application, an on-screen display (OSD), a user interface (UI) for controlling various operations, etc. based on a signal/data stored in an internal/external storage medium. According to embodiments of the disclosure, the display apparatus 100 schematizes connection between the display apparatus 100 and at least one external apparatus 200 and displays the schematized connection as the UI.

According to an embodiment, the display apparatus 100 may be embodied by a smart TV or an Internet protocol (IP) TV. The smart TV refers to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV includes an open software platform to provide an interactive service to a user. Therefore, the smart TV is capable of providing various pieces of content, for example, an application for a predetermined service to a user through the open software platform. Such an application refers to an application program for providing various kinds of services, for example, a social network service (SNS), finance, news, weather, a map, music, a movie, a game, an electronic book, etc.

However, the concept of the disclosure is not limited to the foregoing embodiments of the display apparatus 100, and thus the display apparatus 100 may be applied to various kinds of examples capable of processing an image, such as a monitor connected to a computer, etc. as well as the TV.

The display apparatus 100 according to an embodiment of the disclosure is configured to perform network communication with various types of external apparatuses 200. As shown in FIG. 1, the external apparatus 200 may for example include a set-top box (STB) 201, a smartphone 202, a notebook computer 203, a game console 203, etc. According to the disclosure, the external apparatus 200 connectable to the display apparatus 100 is not limited to those shown in FIG. 1, but may include a mobile device such as a cellular phone, a smartphone, a tablet computer, a smart pad, etc.; a personal computer (PC) such as a laptop computer or a desktop computer; a player for an optical disc such as a Blu-ray disc, a digital versatile disc (DVD), etc.; a content provider (or an image source) such as an audio/video receiver; 3D glasses, virtual reality (VR) devices; and any apparatus capable of carrying out communication through a wired or wireless network.

Figure 2:
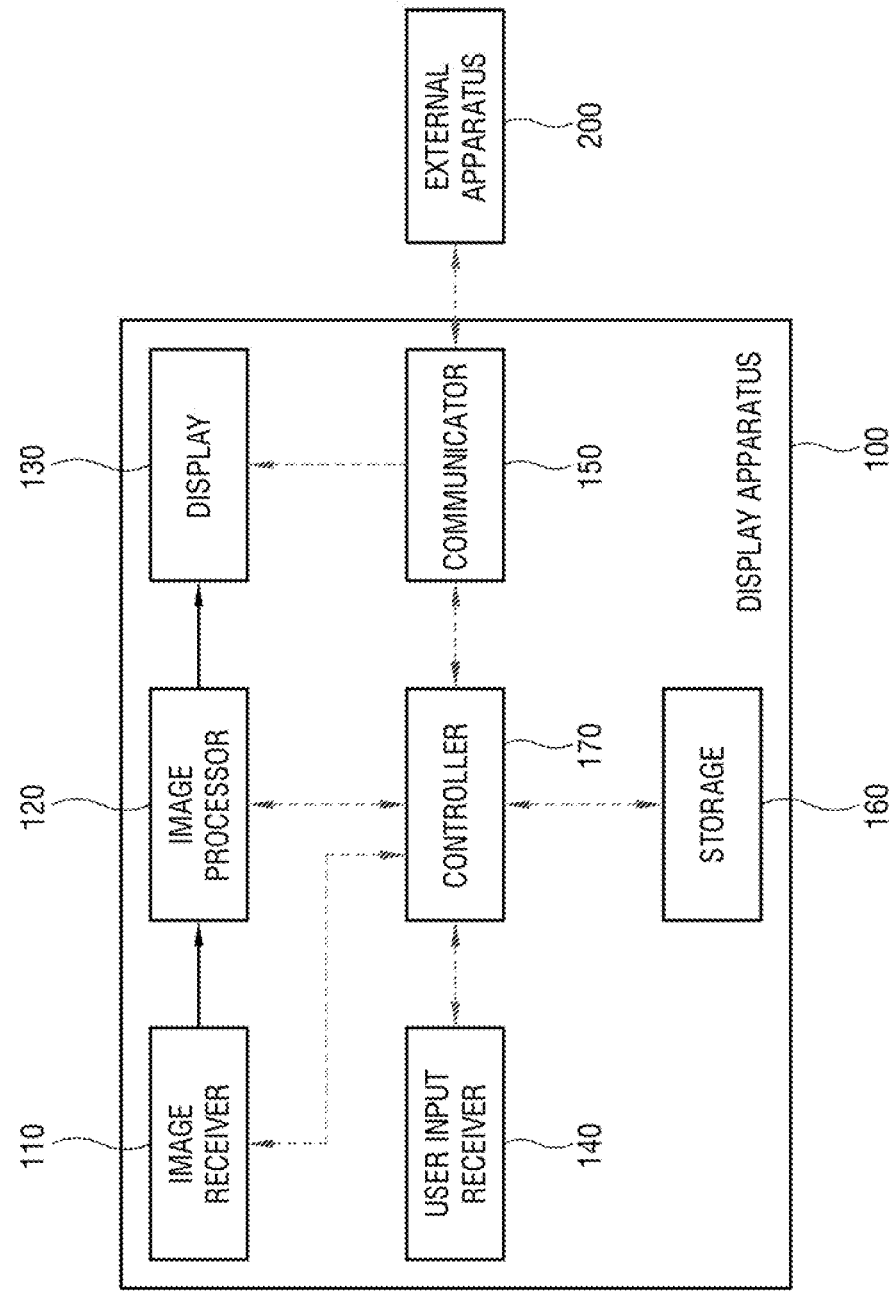
FIG. 2 is a block diagram of a display apparatus according to an embodiment of the disclosure.

FIG. 2 is a block diagram of a display apparatus according to an embodiment of the disclosure.

As shown in FIG. 2, the display apparatus 100 includes an image receiver 110, an image processor 120, a display 130, a user input receiver 140, a communicator 150, a storage 160, and a controller 170.

The image receiver 110 receives an image signal (i.e. content) from the outside and transmits it to the image processor 120. The standards of the received signal may be varied depending on the types of the display apparatus 100. For example, the image receiver 110 may receive a radio frequency (RF) signal from a broadcasting station (not shown) wirelessly, or may receive an image signal based on composite video, component video, super video, syndicat des constructeurs des appareils radiorécepteurs et téléviseurs (SCART), high definition multimedia interface (HDMI) and the like standards by a wire.

According to an embodiment, the image receiver 110 may include a tuner to be tuned to a channel for a broadcast signal when the image signal is the broadcast signal. Further, the image signal may be received from various peripheral devices such as the external device 200. Further, the image signal may be based on data received through the Internet or the like network. In this case, the display apparatus 100 may receive the image signal through the communicator 150 to be described later.

Further, the image signal may be based on data stored in a flash memory, a hard disk drive (HDD), and the like nonvolatile storage 160. The storage 160 may be provided inside or outside the display apparatus 100. When the storage 160 is provided at the outside, a connector (not shown) may be added for connection with the storage 160.

The image processor 120 performs various preset video/audio processing processes with regard to the image signal received from the image receiver 110. The image processor 120 outputs an output signal, which is generated or combined by performing such an image processing process, to the display 130, so that the display 130 can display an image based on the image signal.

The image processor 120 includes a decoder for decoding an image signal to have an image format for the display apparatus 100, and a scaler for scaling the image signal according to the output standards of the display 130. The decoder in this embodiment may for example be embodied by a moving picture experts group (MPEG) decoder. Here, there are no limits to the kinds of image processing process performed in the image processor according to the exemplary embodiment. For example, the image processing process may perform at least one of various processes such as de-interlacing for converting an interlaced broadcast signal into a progressive broadcast signal, noise reduction for improving image quality, detail enhancement, frame refresh rate conversion, line scanning, etc.

The image processor 120 may be embodied as each individual group for independently performing such a process, or as it is included in a system-on-chip (SoC) where various functions are integrated. A main SoC may include at least one microprocessor or central processing unit (CPU) as an example of the controller 170 to be described later.

According to an embodiment, the image processor 120 may be embodied by an image board including circuit elements such as various chipsets for performing respective processes, a memory, electronic parts, wirings, etc. are mounted on to a printed circuit board (PCB). In this case, the image receiver 110, the image processor 120 and the controller 170 of the display apparatus 100 may be provided on a single image board. Of course, this is merely an example, and the image receiver 110, the image processor 120 and the controller 170 of the display apparatus 100 may be arranged on a plurality of PCBs connecting and communicating with each other.

The image signal processed by the image processor 120 is output to the display 130. The display 130 displays an image based on the image signal received from the image processor 120.

There are no limits to the type of the display 130. For example, the display 130 may be embodied in various display types such as liquid crystal, plasma, light-emitting diodes, organic light-emitting diodes, a surface-conduction electron-emitter, a carbon nano-tube, nano-crystal, etc. The display 130 may additionally include an appended element (e.g. a driver) according to the display types.

The user input receiver 140 transmits various preset control commands or unrestricted information to the controller 170 in response to a user's input.

The user input receiver 140 includes a keypad (or an input panel) including buttons such as a power key, a menu key, etc. provided in the main body of the display apparatus 100. According to an embodiment, the user input receiver 140 includes an input unit for generating a preset command/data/information/signal previously set for remotely controlling the display apparatus 100 and transmitting it to the display apparatus 100. The input unit is provided separately from the main body of the display apparatus 100 like a remote controller and allows a user to make an input. The remote controller may be provided with a touch sensor for sensing a user's touch input and/or a motion sensor for sensing its own motion caused by a user. The input unit may include a terminal apparatus such as a smart phone, in which a remote-control application is installed. In this case, the input unit may receive a user's touch input through a touch screen.

The input unit serves as an external apparatus for wireless communication with the main body of the display apparatus 100, and the wireless communication includes Bluetooth, infrared communication, radio frequency communication, wireless local area network (WLAN), Wi-Fi direct, etc.

According to an embodiment, the user input receiver 140 may further include a voice input unit to receive a sound/voice uttered by a user. The voice input unit may be embodied by a microphone to receive a voice signal.

According to an embodiment, the display apparatus 100 displays a UI, in which the external apparatuses 200 connected or connectable to the display apparatus 100 are schematized in a radial shape, etc., in response to a predetermined event that occurs based on a user input or the like. The displayed UI includes a plurality of items corresponding to the display apparatus 100 and at least one external apparatus 200, and allows a user to make a user input to these items so that the external apparatus 200 corresponding to a predetermined item can be connected to or disconnected from the display apparatus 100. Further, the UI shows the corresponding items to distinguish between the external apparatuses connected to the display apparatus 100 and the external apparatuses disconnected from the display apparatus 100, and further shows information about the states of the external apparatus 200.

The communicator 150 is configured to communicate with various external apparatuses including the input unit provided as the user input receiver 140 through a wired or wireless communication method. The communicator 150 includes a wired and/or wireless communication module.

According to an embodiment, the communicator 150 includes at least one module for short-range communication such as Bluetooth, Bluetooth low energy, radio frequency (RF) communication, infrared data association (IrDA), Wi-Fi Direct, Zigbee, ultra-wideband (UWB), near field communication (NFC), etc. The short-range communication module is provided to support direct communication between the display apparatus 100 and the external apparatus 200 wirelessly without an access point (AP).

According to an embodiment, the communicator 150 further includes a WLAN unit. The WLAN unit may wirelessly connect with the external apparatus 200 through the AP under control of the controller 170. The WLAN unit may include a Wi-Fi communication module.

According to an embodiment, the communicator 150 may include a module for wired communication such as Ethernet, etc.

According to an embodiment, the communicator 150 may be configured to include communication modules based on various communication methods including mobile communication such as long-term evolution (LTE), electromagnetic (EM) communication such as a magnetic field, visible light communication (VLC), acoustic communication, etc.

In the display apparatus 100 according to an embodiment of the disclosure, the communicator 150 may include one among a short-range communication module, a WLAN unit, a wired communication module, a mobile communication module, an EM communication module, a VLC module, and acoustic communication module, or combination of more than two of them in accordance with performance thereof.

According to an embodiment, the display apparatus 100 communicates with the external apparatus 200 through the communicator 150. When the display apparatus 100 directly communicates with the external apparatus 300, the storage 160 may be storing identification information (e.g. a media access control (MAC) address or an Internet protocol (IP) address) about the apparatus to be targeted for the communication.

According to an embodiment, the display apparatus 100 may serve as a relay, i.e. a so-called AP for communication between the plurality of external apparatuses. To this end, the storage 160 is configured to store and manage identification information (e.g. a MAC address or an IP address) of each individual external apparatus, and provide the stored identification information of an external apparatus to another external apparatus which is going to communicate with the external apparatus.

The storage 160 is configured to store various pieces of data of the display apparatus 100. The storage 160 may be embodied by a nonvolatile memory (e.g. a writable read only memory (ROM)) in which data is retained even though power supplied to the display apparatus 100 is cut off, and which writes and reflects changes. That is, the storage 160 may be embodied by one of a flash memory, an erasable and programmable read only memory (EPROM), and an electrically erasable and programmable read only memory (EEPROM). The storage 160 may further include a volatile memory such as a dynamic random-access memory (DRAM) or a static random access memory (SRAM), of which the reading or writing speed of the display apparatus 100 is faster than the nonvolatile memory.

Data stored in the storage 160 may for example include not only an operating system for operating the display apparatus 100, but also various applications to be run on the operating system, image data, appended data, etc.

Specifically, the storage 160 may be configured to store a signal or data input/output corresponding to operations of the elements under control of the controller 170. The storage 160 may be configured to store a control program for controlling the display apparatus 100, a UI related to an application provided by a manufacturer or downloaded from the outside, images for providing the UI, user information, a document, a database, or associated data.

According to an embodiment, the storage 160 may be configured to further store information about a communication history of the display apparatus 100. The communication history information includes information about the connected external apparatus. The connected external apparatus may refer to not only an external apparatus which is currently transmitting and receiving data through the communicator 150, but also an external apparatus which has been connected to the display apparatus 100 before more than once. In other words, the storage 160 is configured to store the information about the connected external apparatus 200 as information about a registered apparatus.

The information about the registered apparatus, stored in the storage 160, may include the identification information (e.g. the MAC address or the like), user account information, model name, connection date/time, and/or connection times, most-used functions, etc. of the corresponding external apparatus.

In this exemplary embodiment, the term 'storage' is defined to include the storage 160, the ROM (not shown) in the controller 170, the RAM (not shown), a memory card (for example, a micro secure digital (SD) card, and a memory stick) mountable to the display apparatus 100.

The controller 170 performs control for operating general elements of the display apparatus 100. The controller 170 may include a control program (or instruction) for implementing such a control operation, a nonvolatile memory in which the control program is installed, a volatile memory in which at least a part of the installed control program is loaded, and at least one processor or CPU for executing the loaded control program.

The processor may include a single-core processor, a dual-core processor, a triple-core processor, a quad-core processor, and the like multiple-core processor. The processor may include a plurality of processors, for example, a main processor and a sub processor that operates in a sleep mode, e.g. when the content providing apparatus receives only standby power and does not fully operates. Further, the processor, the ROM and the RAM may be connected to one another via an internal bus.

When the display apparatus 100 according to an embodiment of the disclosure is embodied by a monitor, the controller 170 may further include a graphic processing unit (GPU, not shown) for graphic processing.

Further, when the display apparatus 100 according to an alternative embodiment of the disclosure is embodied by a digital TV, a processor may include a GPU. For example, the processor may be embodied in the form of a SoC where a core and the GPU are combined.

The processor, which is an example of the controller 170 according to an exemplary embodiment, may be achieved as included in a main SoC mounted to a built-in PCB of the display apparatus 100. Alternatively, the main SoC may further include the image processor 120 for processing an image signal.

The control program may include a program(s) achieved in the form of at least one among a basic input/output system (BIOS), a device driver, an operating system, a firmware, a platform, and an application. According to one exemplary embodiment, the application may be previously installed or stored in the display apparatus 100 when the display apparatus 100 is manufactured, or may be installed in the display apparatus 100 for use in the future on the basis of data received corresponding to the application from the outside. The data of the application may for example be downloaded from an external server such as an application market to the display apparatus 100. Such an external server is an example of a computer program product according to an exemplary embodiment, but not limited thereto.

According to an embodiment, the controller 170 searches for the external apparatus connected through the communicator 150 and the external apparatus connectable through the communicator 150, and controls the display 130 to display a UI which distinguishes between the connected external apparatus and the connectable external apparatus. The connectable external apparatus refers to a new apparatus found through the search as an external apparatus that is not currently and has not been connected to the display apparatus 100.

The controller 170 may control the display 130 to display a UI, which includes a first item corresponding to the display apparatus 100 and a second item corresponding at least one external apparatus, in response to occurrence of a predetermined event (for example, a user input of selecting a menu related to the external apparatus of the display apparatus 100, change in a network status, detection of a new connectable apparatus, etc.). The external apparatus corresponding to the second item includes the connected external apparatus and the external apparatus not connected but found.

Further, when a user input is made to select one of at least one second item, the controller 170 controls the communicator 150 so that an external apparatus corresponding to the selected item can be connected to or disconnected from the display apparatus 100. For example, when the communicator 150 includes a module for Bluetooth or the like short-range communication, the controller 170 transmits the identification information (e.g. the MAC address) of the display apparatus 100 to the external apparatus for connection, receives and stores the identification information of the external apparatus from the external apparatus, thereby setting the connection between them. A procedure of setting the connection may include password input, certificate transmission/reception, and the like security authentication.

According to one exemplary embodiment, the operations of the controller 170 may be achieved by a computer program stored in the computer program product (not shown) provided separately from the display apparatus 100.

In this case, the computer program product includes a memory where an instruction corresponding to the computer program is stored, and a processor. The instruction may be issued to display the UI, in which the display apparatus 100 and at least one external apparatus 200 are schematized when executed by the processor, and connect or disconnect a predetermined external apparatus to or from the display apparatus in response to a user input to the displayed UI.

Thus, the display apparatus 100 downloads and executes the computer program stored in a separate computer program product, thereby performing the operations of the controller 170.

Below, embodiments that the display apparatus 100 according to the disclosure displays the connection status of the external apparatus 200 and is connected to or disconnected from the external apparatus 200 in response to a user input will be described with reference to the accompanying drawings.

Figure 3:
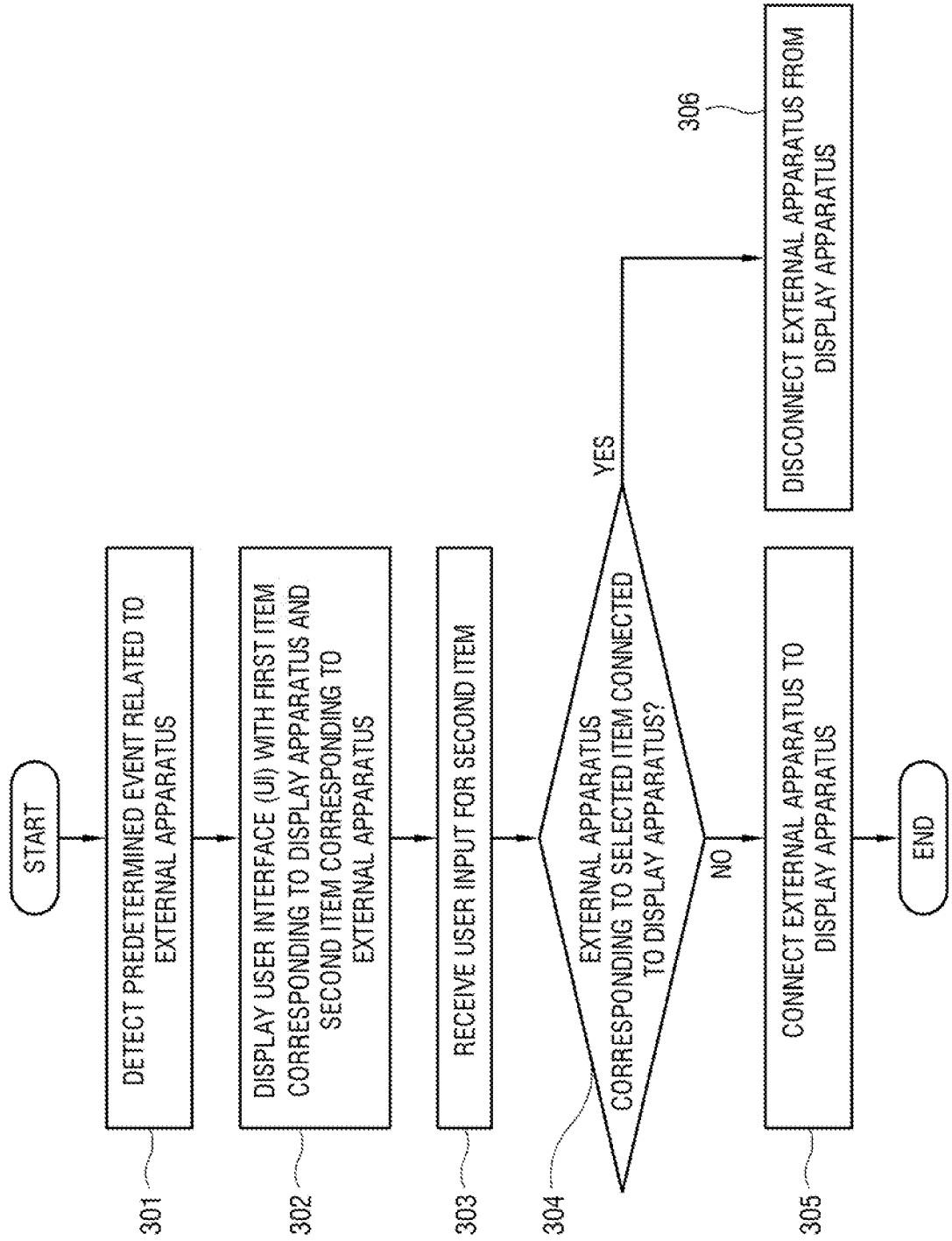
FIG. 3 is a flowchart showing a method of controlling a display apparatus according to an embodiment of the disclosure.

FIG. 3 is a flowchart showing a method of controlling a display apparatus according to an embodiment of the disclosure.

As shown in FIG. 3, the display apparatus 100 detects a predetermined event related to an external apparatus (301). The event may occur based on a user input, or may automatically occur under a preset condition. For example, the event may include a user input of selecting a menu, i.e. an external input menu related to the external apparatus of the display apparatus 100, change in a network status of the display apparatus 100, detection of a new connectable external apparatus, a case where a predetermined condition set by a user, a manufacturer, a broadcasting service provider, etc. is satisfied, and so on.

The controller 170 of the display apparatus 100 controls the display 130 to display a UI, which includes the first item corresponding to the display apparatus 100 and the second item corresponding to the external apparatus 200, in response to the event detected in the operation 301 (302). Here, the controller 170 performs control to display a UI about the latest status of connection with the external apparatus 200 using the communicator 150.

FIGS. 4 to 7 illustrate UIs displayed by a display apparatus according to an embodiment of the disclosure.

Figure 4:
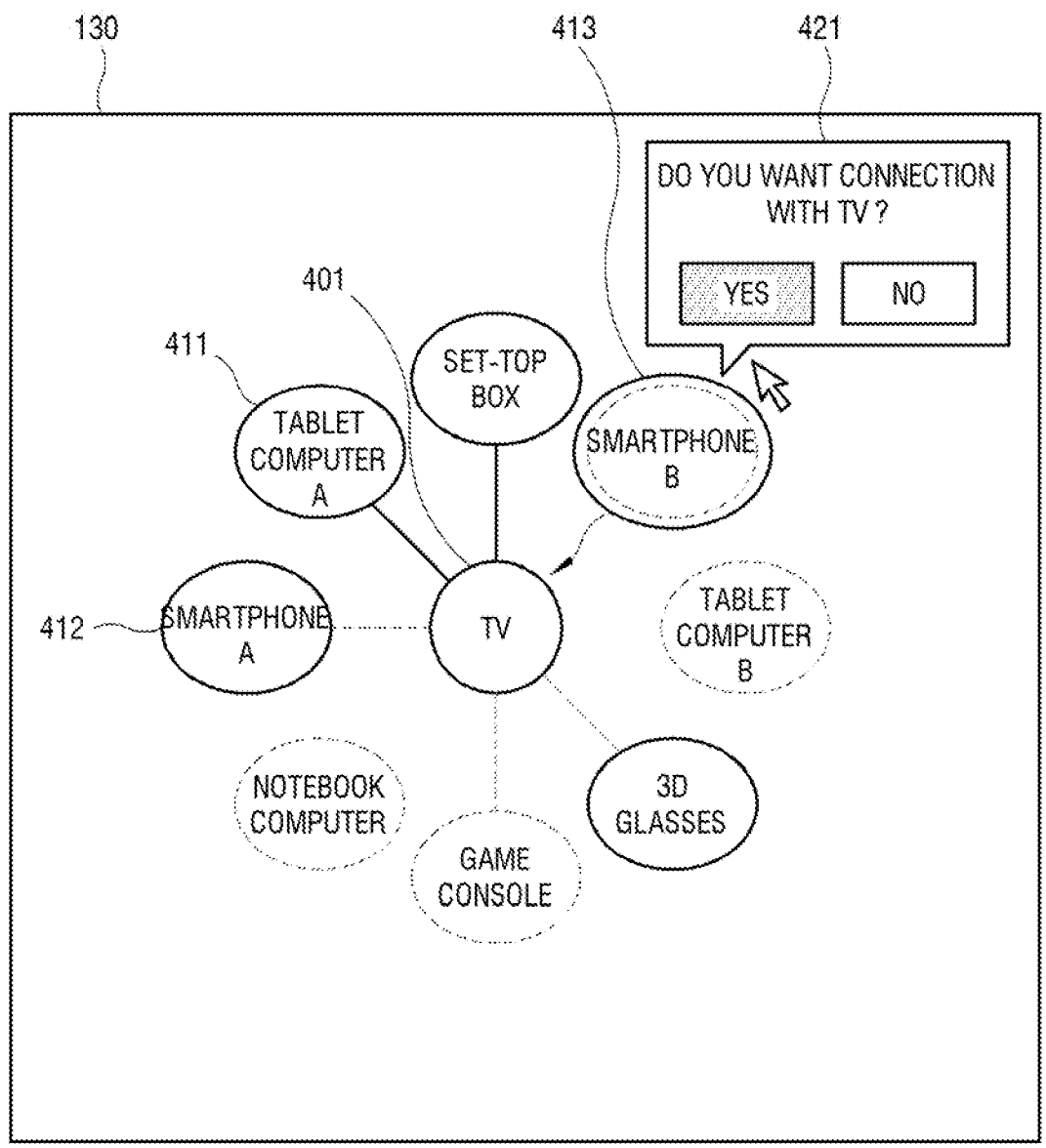
FIGS. 4 to 7 illustrate user interfaces (UIs) displayed by a display apparatus according to an embodiment of the disclosure.

As shown in FIG. 4, the UI displayed on the display 130 includes a first item 401 corresponding to the display apparatus 100 and a second item 411, 412 or 413 corresponding to at least one external apparatus 200.

The UI is displayed to distinguish between the second items 411 and 412 corresponding to a tablet computer A and a smartphone A, i.e. the external apparatuses connected to the display apparatus, and the second item 413 corresponding to a smartphone B, i.e. the external apparatus disconnected from the display apparatus 100. For example, as shown in FIG. 4, the second items 411 and 412 corresponding to the connected external apparatus, i.e. the tablet computer A and the smartphone A are displayed as connected to the first item 401 with lines, but there is no line between the second item 413 corresponding to the disconnected external apparatus, i.e. the smartphone B and the first item 401.

Further, in terms of displaying the second items of the connected external apparatuses, the UI is displayed to distinguish between the corresponding external apparatus that is being currently connected and the corresponding external apparatus that has been connected before. For example, as shown in FIG. 4, the second item 411 corresponding to the tablet computer A, i.e. the external apparatus that is being currently connected is displayed as connected to the first item 401 with a solid line, but the second item 412 corresponding to the smartphone A, i.e. the external apparatus that has been connected before is displayed as connected to the first item 401 with a dotted line. Here, the solid line and the dotted line are merely given by way of example, and the disclosure may use various methods of distinguishing between the external apparatus that is being currently connected and the external apparatus that has been connected before.

Figure 5:
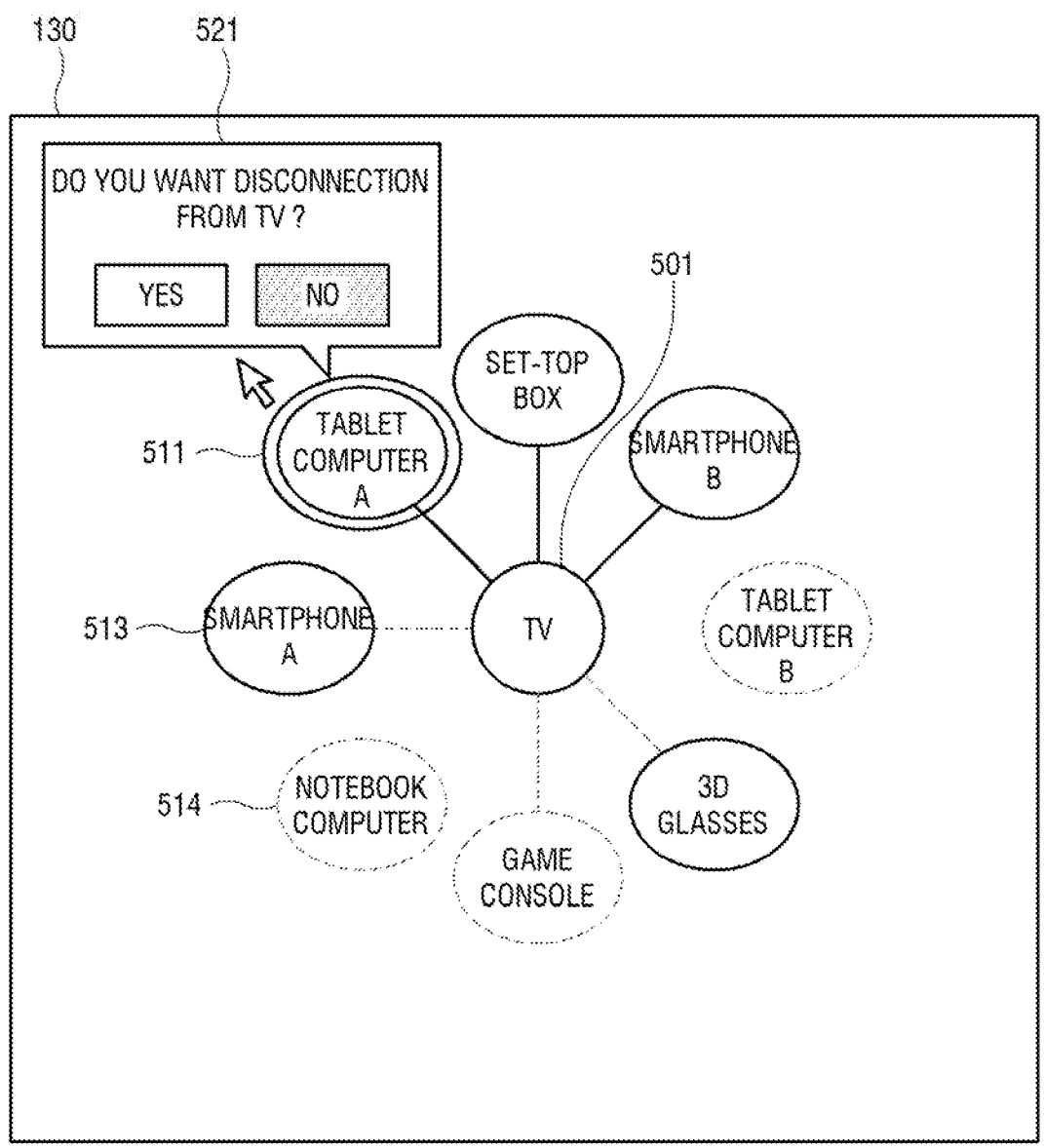

Even in the embodiment shown in FIG. 5, like that of FIG. 4, the external apparatus that is being currently connected and the external apparatus that has been connected before may be displayed by various methods to be distinguished from each other.

Even in the embodiment shown in FIG. 5, like that of FIG. 4, a UI displayed on the display 130 includes a first item 501 corresponding to the display apparatus 100 and a second item 511, 512 or 513 corresponding to at least one external apparatus 200.

The UI is displayed to distinguish between the second items 511 and 513 corresponding to a tablet computer A and a smartphone A, i.e. the external apparatuses connected to the display apparatus, and a second item 514 corresponding to a notebook computer, i.e. the external apparatus disconnected from the display apparatus 100. Further, in the UI, the second item 511 corresponding to the external apparatus that is being currently connected, i.e. the tablet computer A is displayed as connected to the first item 501 with a solid line, but the second item 513 corresponding to the external apparatus that has been connected before, i.e. the smartphone A is displayed as connected to the first item 501 with a dotted line, thereby distinguishing between the apparatus that is being currently connected and the apparatus that has been connected before.

The controller 170 selects one of at least one second item displayed as above, and controls the external apparatus corresponding to the selected item to be connected to or disconnected from the display apparatus 100 through the communicator 150.

Specifically, as shown in FIG. 3, the controller 170 may receive a user input made for a predetermined second item (303).

In response to the user input made in the operation 303, the controller 170 identifies whether the external apparatus corresponding to the selected item is connected to the display apparatus 100 (304).

When it is identified in the operation 304 that the external apparatus is disconnected from the display apparatus 100, the controller 170 controls the corresponding external apparatus to be connected to the display apparatus 100 (305).

On the other hand, when it is identified in the operation 304 that the external apparatus is connected to the display apparatus 100, the controller 170 controls the corresponding external apparatus to be disconnected from the display apparatus 100 (306).

Specifically, referring to FIG. 4, a user may make a user input to select one item 413 among the second items 411, 412, and 413. The controller 170 may control the display 130 to display the selected item 413 to be differentiated by a pointer or cursor.

The controller 170 identifies whether the external apparatus corresponding to the selected item 413 is connected or disconnected. As a result of identification, when the external apparatus corresponding to the selected item 413 is disconnected, the controller 170 controls the external apparatus corresponding to the selected item 413, i.e. the smartphone B to be connected to the display apparatus 100 through the communicator 150. According to an embodiment, the controller 170 may identify whether to connect the external apparatus of the selected item to the display apparatus 100, when a user input is made for a predetermined key of a remote controller provided as the user input receiver 140 after the second item 413 is selected.

Here, the controller 170 may control the display 130 to display a message 421 for receiving a user's selection about whether to connect the apparatus corresponding to the selected item 413, and control the external apparatus corresponding to the selected item 413 to be connected to the display apparatus 100 through the communicator 150 in response to a user's selection on the displayed message 421.

The controller 170 transmits a packet of a connection request to the external apparatus of the corresponding item 413, i.e. the smartphone B, and receives a packet of a corresponding response from the smartphone B. The received response may be transmitted to the display apparatus 100 in response to a user's selection made in the smartphone B. The controller 170 completely sets the connection between the display apparatus 100 and the smartphone B when the response packet is received from the smartphone B. Further, the procedure of setting the connection may include security authentication such as password input, certificate transmission/reception, and the like security authentication. For example, the controller 170 may perform security authentication based on a certificate received from the smartphone B.

When the connection between the display apparatus 100 and the external apparatus corresponding to the selected item 413 are completely set, the controller 170 controls the display 130 to display the corresponding item 413 to be shown as connected to the first item 401 by reflecting the connection.

Meanwhile, referring to FIG. 5, a user may make a user input of selecting one item 511 among the second item 511, 513, and 514. The controller 170 may display the selected item 410 to be differentiated with a pointer or a cursor on the display 130.

The controller 170 identifies whether the external apparatus corresponding to the selected item 511 is connected or disconnected. According to an embodiment, a user input is made for a predetermined key of a remote controller provided as the user input receiver 140 after the second item 511 is selected, the controller 170 may identify whether to connect the external apparatus of the corresponding item to the display apparatus 100.

When it is identified that the external apparatus of the selected item 511 is connected, the controller 170 controls the communicator 150 to disconnect the external apparatus corresponding to the selected item 511, i.e. the tablet computer B from the display apparatus 100. For example, when a user intends to use a new tablet computer B and does not intend to use the existing tablet computer A any more, the controller 170 may release the connection of the corresponding item 521.

Here, the controller 170 may control the display 130 to display a message 521 for receiving a user's selection about whether to connect the apparatus corresponding to the selected item 511, and control the external apparatus corresponding to the selected item 511 to be disconnected from the display apparatus 100 through the communicator 150 in response to a user's selection on the displayed message 521.

Thus, the controller 170 deletes information for connecting with the tablet computer A from the storage 160. Here, the controller 170 transmits a packet of a disconnection request to the external apparatus of the corresponding item 511, i.e. the tablet computer A, and receive a packet of a corresponding response from the tablet computer A. The tablet computer A may delete information for connection with the display apparatus 100 in response to a user's selection based on the received disconnection request.

When the connection between the display apparatus 100 and the external apparatus corresponding to the selected item 511 is released, the controller 170 controls the display 130 to display the corresponding item 511 and the first item 401 without the connection line by reflecting the released connection.

When subsequent connection or disconnection of the external apparatus does not additionally occur, a UI based on an event detected in the next operation 301 is displayed reflecting the connection and disconnection of FIGS. 4 and 5.

Meanwhile, the UI displayed in the operation 302 may further include information about the state of at least one external apparatus 200. Here, the controller 170 may control the display 130 to display a UI which shows at least one of the shape, color or text of the second item to distinguish at least one of the kind, model or user of the corresponding external apparatus.

Referring to FIGS. 4 and 5, the kind of external apparatus is represented by the text in the second item. When there is a plurality of same kind of external apparatuses, they may be distinguished in between like the smartphone A and the smartphone B or the tablet computer A and the tablet computer B as shown in FIGS. 4 and 5. Although it is not shown, the UI may show the same kind of external apparatuses to be distinguished by users, model names, etc.

Further, the UI may include information about the state of the external apparatus, which is represented with the shape or color of the second item corresponding to the external apparatus. For example, the items of the tablet computer A and the tablet computer B may be represented with icons shaped like a tablet computer, and the two apparatuses may be displayed as distinguished from each other by color.

According to an embodiment, the information about the state of the external apparatus 200, displayed on the UI, may further include network status information, location information, guide information, etc.

Figure 6:
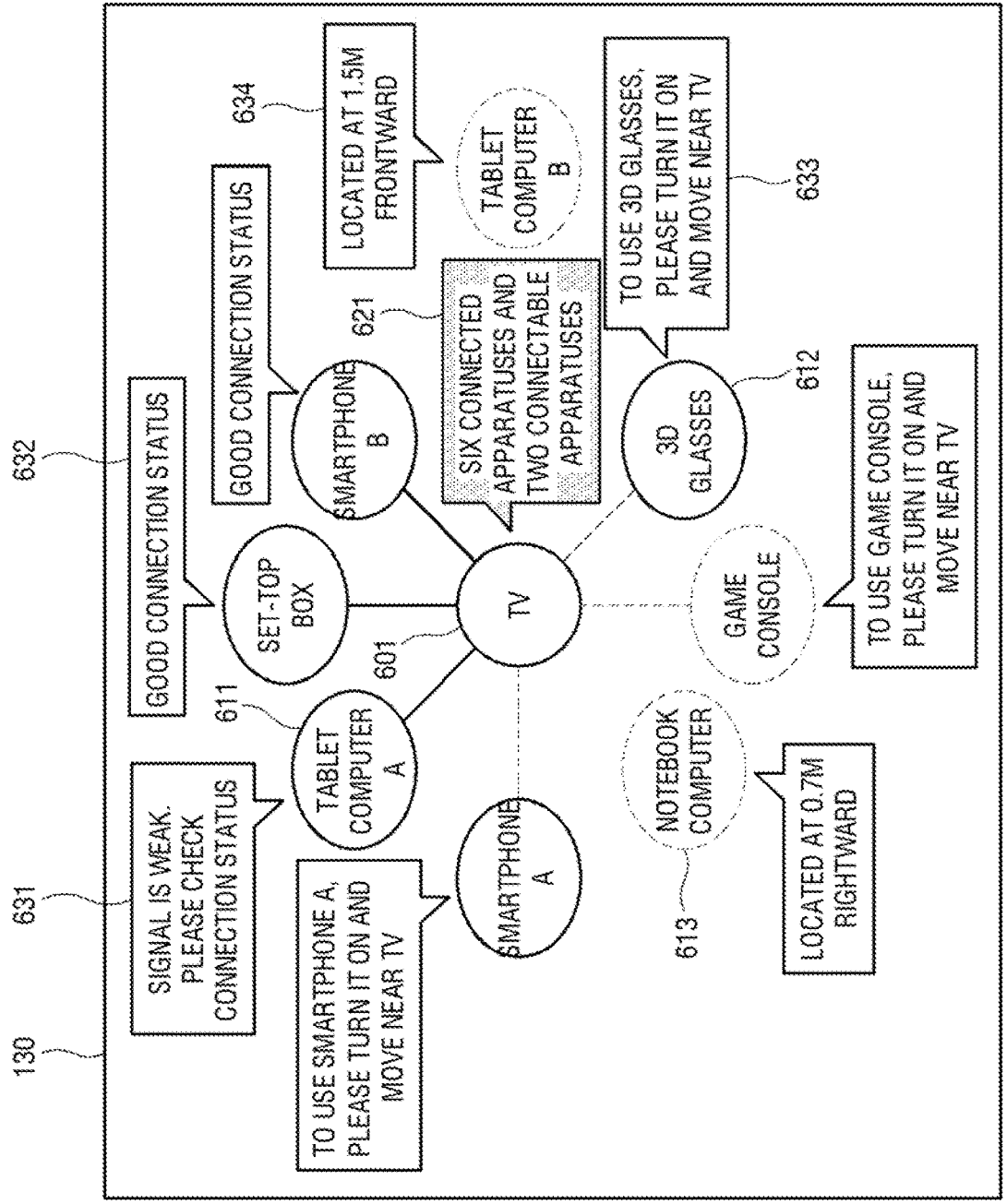

When the network connection status of the tablet computer A is unstable, the controller 170 may for example display a message 631 of network status information in addition to a corresponding second item 611 as shown in FIG. 6. When the network connection status is stable like a set-top box, a message 632 of a good connection status is displayed in addition to a corresponding second item.

As shown in FIG. 6, the controller 170 may additionally display a message 634 of location information about an external apparatus with respect to the display apparatus 100. The location information may include information about a distance, a direction, etc.

The distance information may be estimated based on received signal strength indication (RSSI) of the communicator 150. A wireless communication module is capable of measuring the RSSI, and the controller 170 converts this measured value into a distance, thereby showing the information about the distance from the display apparatus 100.

The location information may be measured by a sensor, a camera, etc. provided in the display apparatus 100.

Alternatively, the location of the external apparatus with respect to the display apparatus 100 may be marked in a space. For example, surrounding environments of the display apparatus 100 are captured by the camera, and the locations of the external apparatuses are identified through the captured image, thereby displaying the external apparatuses marked corresponding to the identified locations.

The guide information may for example refer to a message 633 displayed for a second item 612 corresponding to an external apparatus that is connected but not in use. As shown in FIG. 6, when it is desired to use the corresponding external apparatus, e.g. 3D glasses for the display apparatus 100, the guide information may include a message for guiding the use of the external apparatus. Thus, a user can immediately use the corresponding external apparatus by checking the guide message 633, powering on the external apparatus, and locating the external apparatus near the TV, Referring to FIG. 6, the UI may further display connection information about the display apparatus 100 through a message 621. Through the message 621, a user can easily grasp the number of connected external apparatuses and connectable external apparatuses.

The display apparatus 100 of the disclosure may be configured to display a UI based on at least one among the messages 631, 632, 633 and 634 shown in FIG. 6

According to another embodiment, the state information displayed through the UI may further include use history information of a connected external apparatus. For example, the UI may add a message showing the most frequently used apparatus among the connected external apparatuses, or a message showing the most recently used apparatus. In addition, information about the number of use times of a highly frequently used apparatus for a predetermined period of time, for example, for the latest one month, or information about the latest use time may be further displayed. Thus, a user can easily grasp the generally used external apparatuses through such a displayed UI.

According to still another embodiment, when a user makes a user input for selecting the second item corresponding to a predetermined external apparatus, the controller 170 may directly enter a menu of the corresponding external apparatus and thus allow a user to use the functions of the external apparatus. For example, when a user selects the second item 411 corresponding to the tablet computer A in FIG. 4, the display apparatus 100 enters a use mode for the corresponding apparatus and directly carries out a mirroring function of allowing the display 130 to display content being displayed by the tablet computer A. Here, the controller 170 may set the mirroring function with preset brightness, sound volume, etc. to reproduce the content.

Alternatively, when a user selects the second item corresponding to the set-top box in FIG. 4, the user's favorite channel list may be displayed. When the second item corresponding to the game console is selected, a list of games frequently or recently played by a user may be displayed through the display 130.

According to an embodiment, the UI may be displayed with a plurality of second items respectively corresponding to a plurality of external apparatuses to distinguish whether the plurality of external apparatuses are connected to each other.

Figure 7:
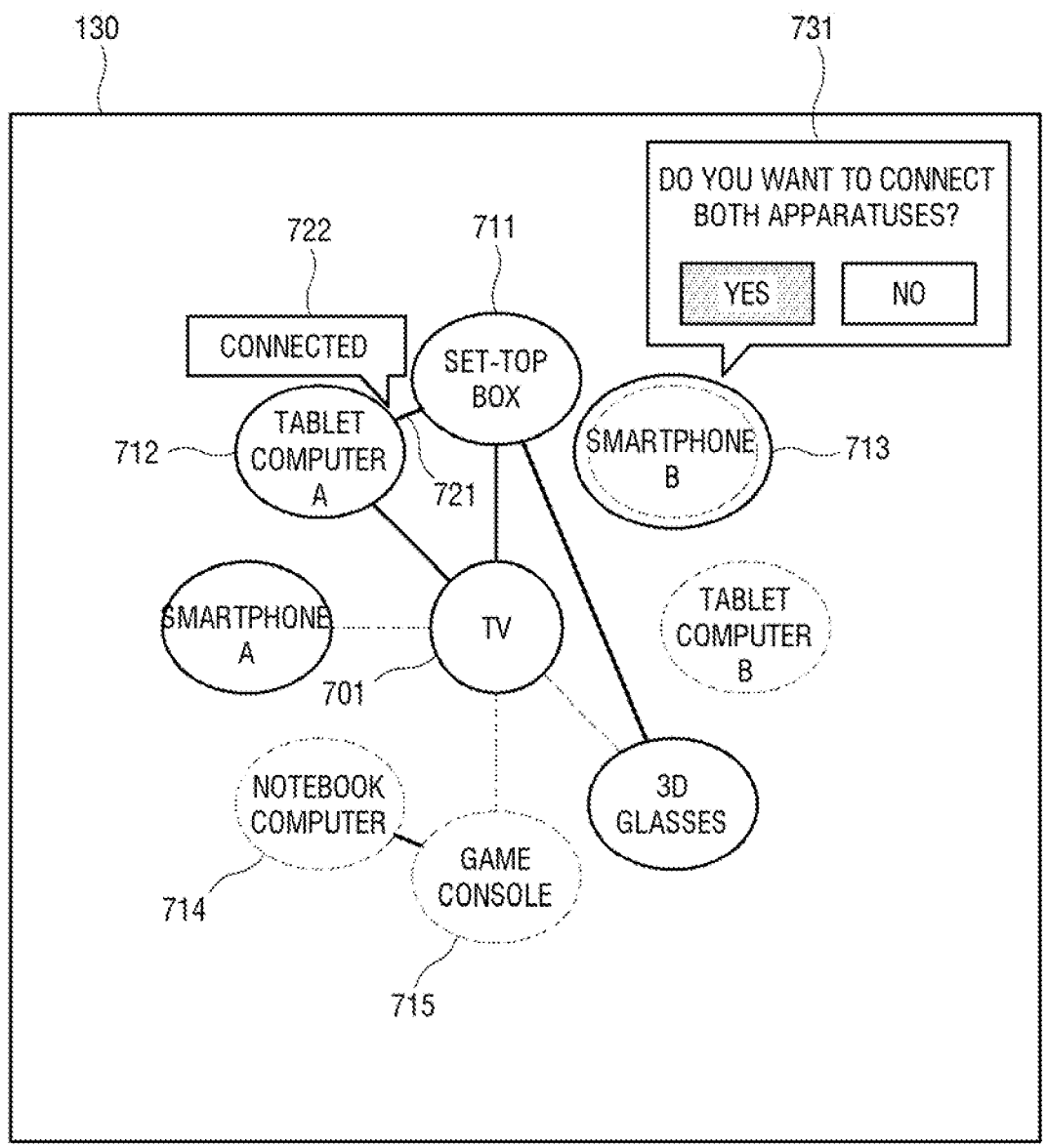

Specifically, as shown in FIG. 7, when the set-top box and the tablet computer A among the external apparatuses are connected to each other, the second items 711 and 712 of the respective corresponding apparatuses are displayed as connected by a line 721, thereby displaying whether the plurality of external apparatuses are connected to each other. Alternatively, a message 722 of informing that both the apparatuses are connected may be additionally displayed.

When a user input is made to select two or more second items among the plurality of second items, the controller 170 may control the communicator 150 to connect or disconnect the two or more corresponding external apparatuses to or from each other.

For example, as shown in FIG. 7, when a user selects both the second item 711 corresponding to the set-top box and the second item 713 corresponding to the smartphone B, the controller 170 may display the two selected items 711 and 713 to be distinguishable on the display 130 by the pointer or the cursor. Here, the controller 170 may display a message 731 of asking whether to connect the two selected apparatuses on the display 130, and control the two apparatuses to be connected to each other in response to a user' selection to the displayed message 731.

According to an embodiment, the controller 170 controls the communicator 150 to transmit the identification information (e.g. MAC address) from one between the two apparatuses, for example, the set-top box to the other external apparatus, i.e. the smartphone B. When a response to the identification information is received from the smartphone B through the communicator 150, the controller 170 transmits the identification information (e.g. MAC address) of the smartphone B to the set-top box through the communicator 150, thereby connecting both the apparatuses with each other.

According to another embodiment, when the controller 170 transmits the identification information from one of the two apparatuses, e.g. the set-top box to the other external apparatus, i.e. the smartphone B, the smartphone B directly transmits a connection request packet to the set-top box. The set-top box transmits a response to the connection request and its own identification information to the smartphone B, thereby setting the connection between the two apparatuses.

According to still another embodiment, the controller 170 may simultaneously transmit the identification information of the two apparatuses to their counterpart apparatuses. In this case, when both the two apparatuses transmit the connection requests at the same time, connection may be delayed due to collision. Therefore, a message may be transmitted including information of designating a host to which the connection request is first transmitted.

The foregoing procedure of setting the connection between the external apparatuses may also include password input, certificate transmission/reception, and the like security authentication.

In the same manner, when a user selects both a second item 714 corresponding to a notebook computer and a second item 715 corresponding to a game console in FIG. 7, the controller 170 may control the communicator 150 to release the connection between the two apparatuses.

Figure 8:
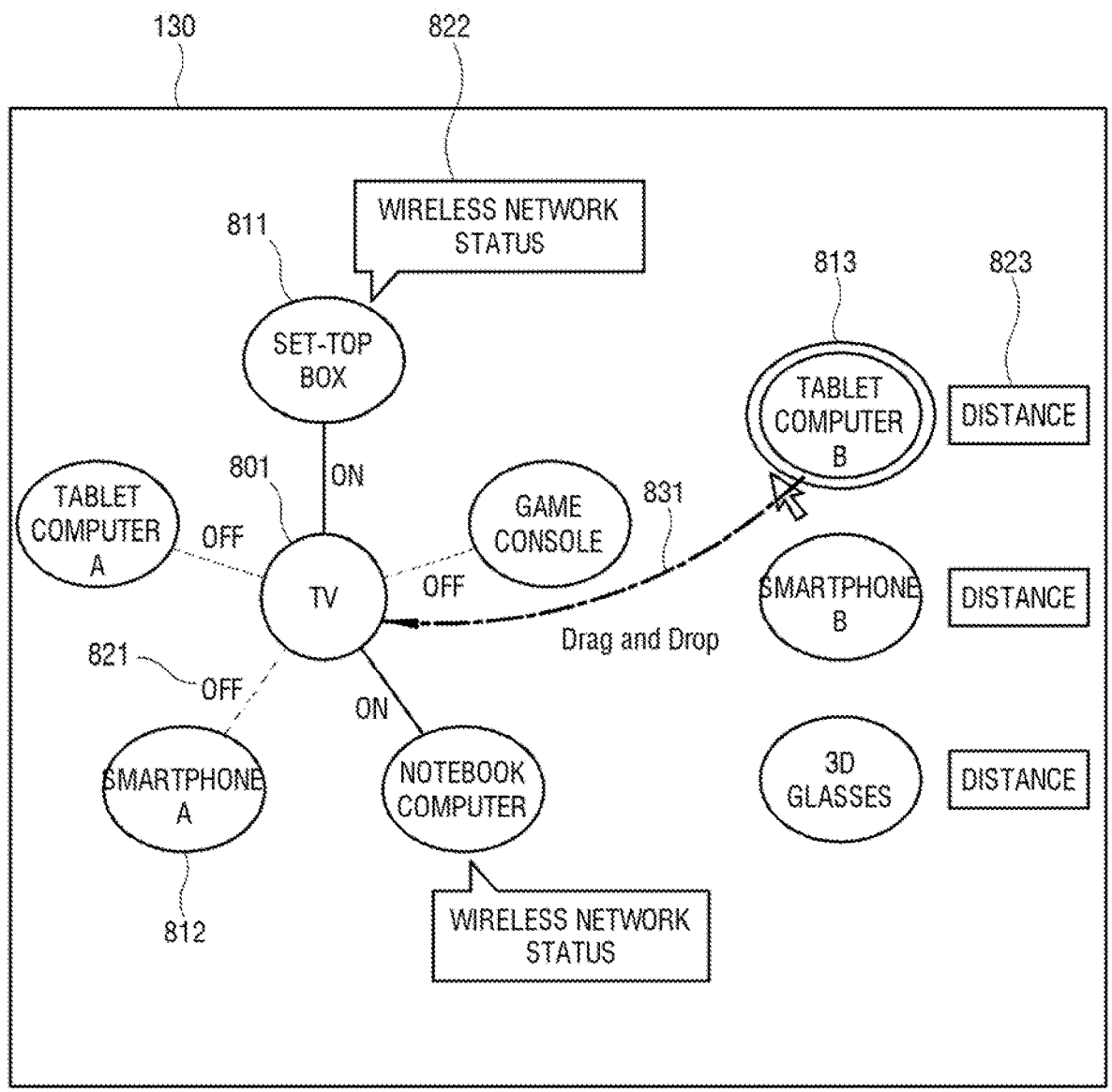
FIGS. 8 to 10 illustrate UIs displayed by a display apparatus according to another embodiment of the disclosure.
Figure 9:
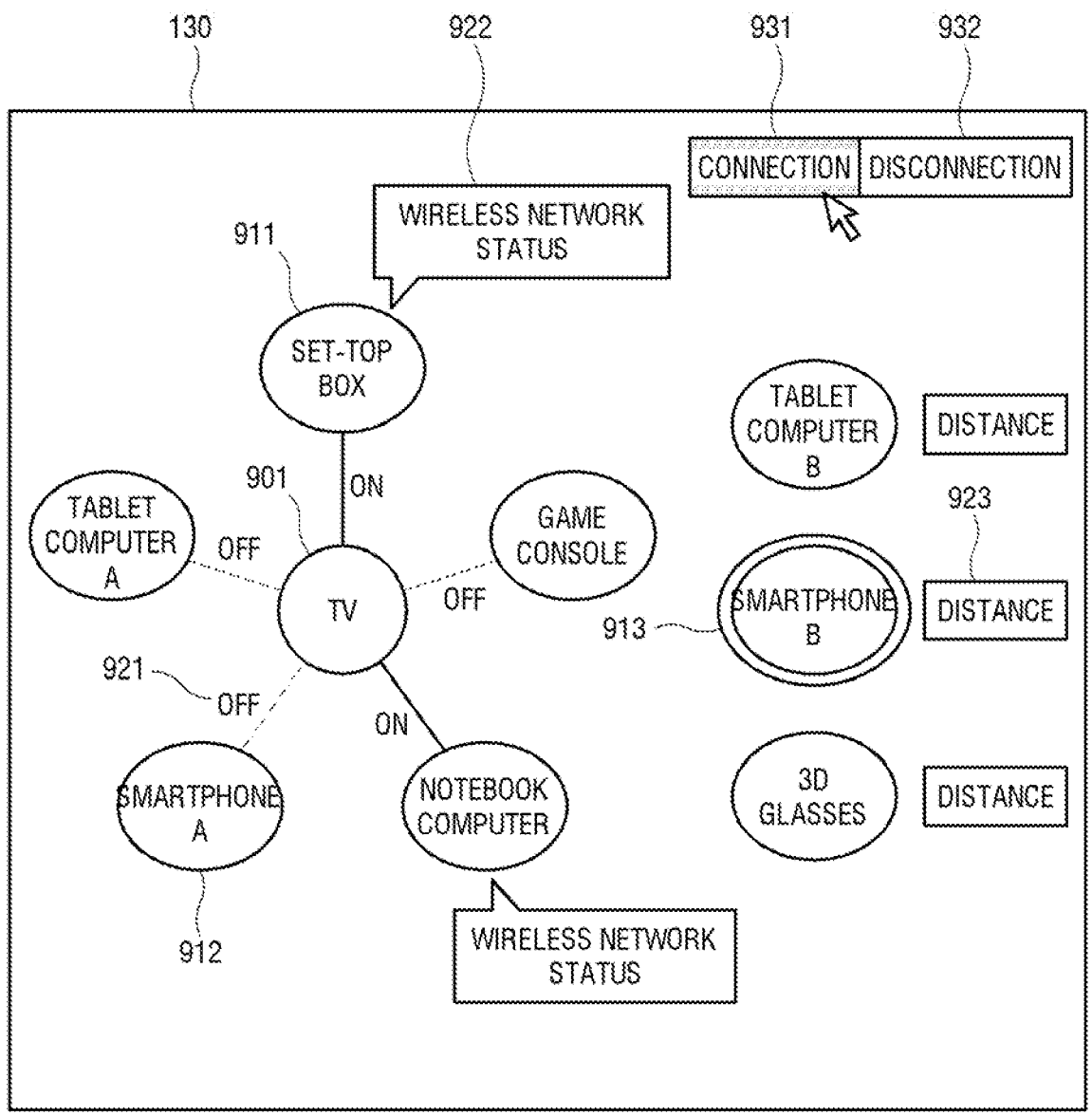
Figure 10:
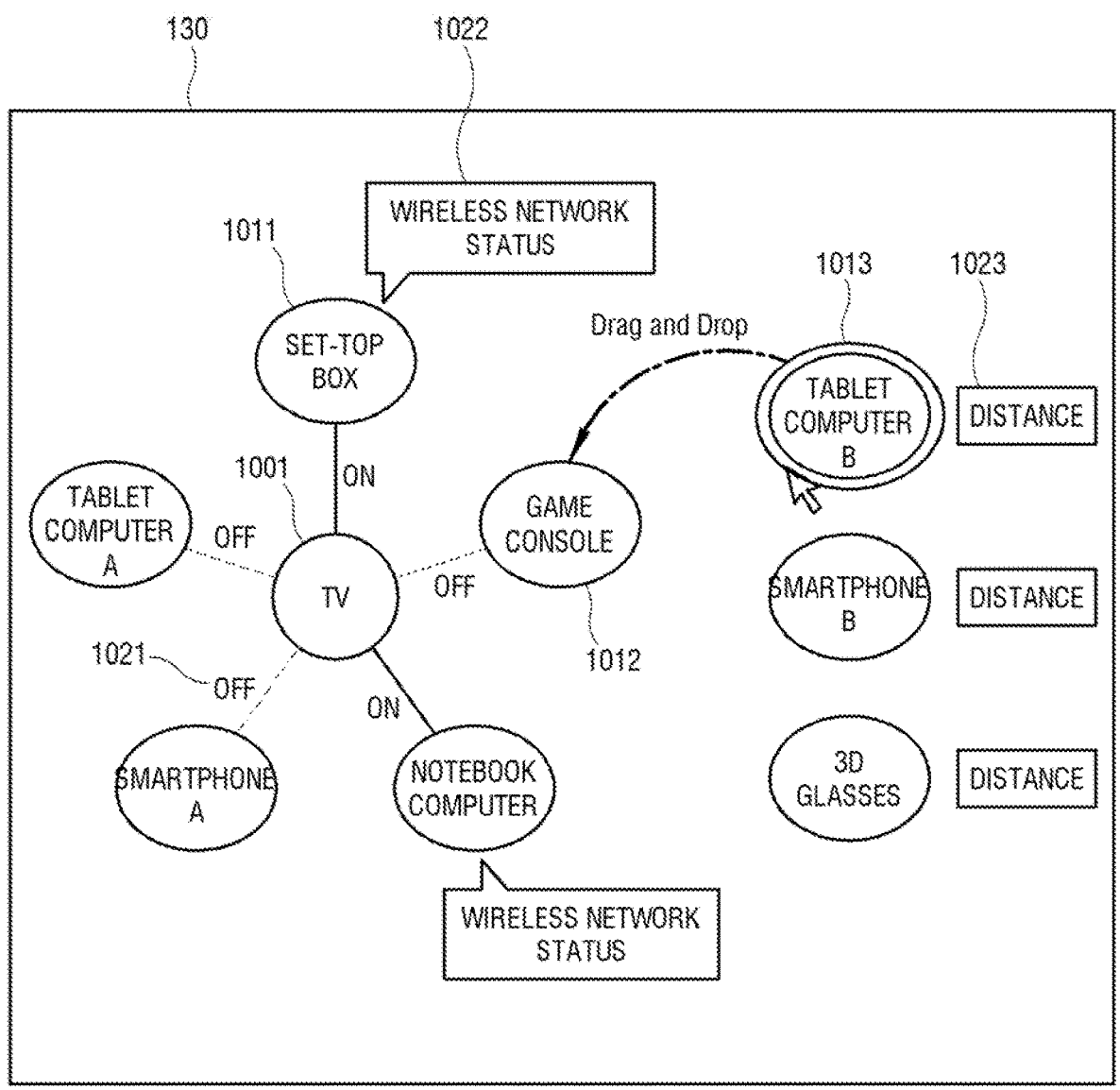

FIGS. 8 to 10 illustrate UIs displayed by a display apparatus according to another embodiment of the disclosure.

The embodiment shown in FIGS. 8 to 10 is characterized in that a second item corresponding to at least one external apparatus is displayed as a UI related to the external apparatus, placing the second item of the connected external apparatus and the second item of the disconnected external apparatus at different positions. Except the displayed UI itself, the controller 170 of the display apparatus 100 of displaying the UI according to this embodiment may perform the same operation as those of the foregoing embodiments, and thus repetitive descriptions will be avoided.

The UI according to the embodiment shown in FIG. 8 to FIG. 10 shows a connection status of at least one external apparatus connected by a wireless network, but a communication connection according to the disclosure is not limited to the wireless network. Alternatively, the external apparatus connected by a wired network such as Ethernet or an interface such as a HDMI besides the wireless network may also be displayed with its connection status in the same manner as that of the embodiment shown in FIGS. 8 to 10.

In the embodiment shown in FIGS. 8 to 10, the second items corresponding to the connected external apparatuses are displayed adjacent to the first item corresponding to the display apparatus 100, and the second items corresponding to the disconnected external apparatuses are displayed farther from the first item than the second items corresponding to the connected external apparatuses.

As shown in FIG. 8, the UI displayed on the display 130 includes a first item 801 corresponding to the display apparatus 100 and a second item 811, 812 or 813 corresponding to at least one external apparatus 200.

In the UI shown in FIG. 8, the second items 811 and 812 corresponding to the connected external apparatus, i.e. the set-top box and the smartphone A are displayed around and adjacent to the first item 801, but the second item 813 corresponding to the disconnected external apparatus, i.e. the tablet computer B is displayed away from the first item 801 and arranged as a separate list. Therefore, it is easier for a user to distinguish the connected apparatus and the disconnected apparatus, and grasp the number of connected external apparatuses at a glance.

To display the UI as shown in FIG. 8, the controller 170 scans a wireless network channel supported in the communicator 150, and schematizes and displays the corresponding connection status. Through the UI, a user can grasp an occupied status of the wireless network at a glance.

In terms of displaying the second items of the connected external apparatuses, as shown in FIG. 8, the UI may be displayed to distinguish whether the corresponding external apparatus is currently connected or has been connected before, with a color, a shape, etc. of a line. In addition, the power status of the connected apparatus is displayed as 'ON' or 'OFF', and a message 822 may further be displayed showing network status information.

Further, as shown in FIG. 8, the UI may further display a message 823 showing location information about the external apparatus disconnected from, i.e. connectable to the display apparatus 100. The location information includes distance information. As the distance information of such a connectable external apparatus is displayed, it is easy for a user to grasp an actual external apparatus. The method of obtaining the location information is the same as described above with reference to FIG. 6.

According to an embodiment, referring to FIG. 8, the controller 170 may receive a user input for moving the second item 813 of the disconnected external apparatus, i.e. the tablet computer B close to the first item 801 through the user input receiver 140, as the user input for the second item described in the operation 303 of FIG. 3. In response to this user input, the controller 170 may control the communicator 150 so that the external apparatus, i.e. the tablet computer B corresponding to the moved second item 813 can be connected to the display apparatus 100. Here, the user input for moving the second item 813 close to the first item 801 may include Drag or Drag and Drop.

Further, the controller 170 may receive a user input for moving the second item 812 of the connected external apparatus (e.g. the smart phone A) away from the first item 801 through the user input receiver 140, as the user input for the second item described in the operation 303 of FIG. 3. In response to this user input, the controller 170 may control the communicator 150 so that the external apparatus corresponding to the moved second item can be disconnected from the display apparatus 100. Here, the position moved away from the first item 801 may be the position in which the second items 813 are listed corresponding to the disconnected external apparatuses, and the user input for the movement may include Drag or Drag and Drop.

According to another embodiment, referring to FIG. 9, the controller 170 may further receive a user input for selecting a connection button 931 through the user input receiver 140 in a state that the second item 913 of the disconnected external apparatus, i.e. the tablet computer B is selected, as the user input for the second item described in the operation 303 of FIG. 3. In response to the selection of the connection button 931, the controller 170 controls the communicator 150 so that the selected external apparatus, i.e. the tablet computer B can be connected to the display apparatus 100.

Further, the controller 170 may further receive a user input for selecting a release button 932 through the user input receiver 140 in a state that the second item 912 of the connected external apparatus (e.g. the smartphone A) is selected, as the user input for the second item described in the operation 303 of FIG. 3. In response to the selection of the release button 932, the controller 170 controls the communicator 150 so that the selected external apparatus, i.e. the smartphone A can be disconnected from the display apparatus 100.

Here, the procedure of setting or releasing the connection of the external apparatus through the communicator 150 is the same as those of the embodiments described above with reference to FIGS. 4 to 6.

According to an embodiment, the controller 170 may control the communicator 150 so that the disconnected external apparatus can be connected to the display apparatus and at the same time the connected external apparatus can be disconnected from the display apparatus in response to a user input for moving the second item of the disconnected external apparatus to the second item of the connected external apparatus or moving the second item of the connected external apparatus to the second item of the disconnected external apparatus.

Specifically, as shown in FIG. 10, the controller 170 may receive a user input (e.g. Drag and Drop) for moving the second item 1013 of the disconnected external apparatus, i.e. the tablet computer B to the position of the second item 1012 of the connected external apparatus, i.e. the game console. In response to the Drag and Drop as shown in FIG. 10, the controller 170 controls the two items 1012 and 1013 to be displayed on the display 130 by swapping their positions, while controlling the communicator 150 so that the disconnected apparatus, i.e. the tablet computer B can be connected to the display apparatus 100 and the connected apparatus, i.e. the game console can be disconnected from the display apparatus 100.

Here, the controller 170 may control the display 130 to display a message for checking whether to swap the positions of the two items 1012 and 1013 or whether to set or release the connection, so that the corresponding external apparatus can be connected to or disconnected from the display apparatus 100 in response to a user input made with regard to the displayed message. Further, the procedure of setting or releasing the connection of the external apparatus through the communicator 150 is the same as those of the embodiments described above with reference to FIGS. 4 to 6.

In the same manner, as shown in FIG. 10, the controller 170 may receive a user input (e.g. Drag and Drop) for moving the second item 1012 of the connected external apparatus, i.e. the game console to the position of the second item 1013 of the disconnected external apparatus, i.e. the table computer B, and control the display 130 to display the two items 1012 and 1013 by swapping their positions in response to the received user input, while controlling the disconnected apparatus, i.e. the tablet computer B to be connected to the display apparatus 100 and the connected apparatus, i.e. the game console to be disconnected from the display apparatus 100.

With such a method, it is convenient for a user to set or release the connection between the display apparatus 100 and the two second items 1012 and 1013 by making an easy user input of swapping the UI positions of the corresponding external apparatuses displayed on the display 130.

Figure 11:
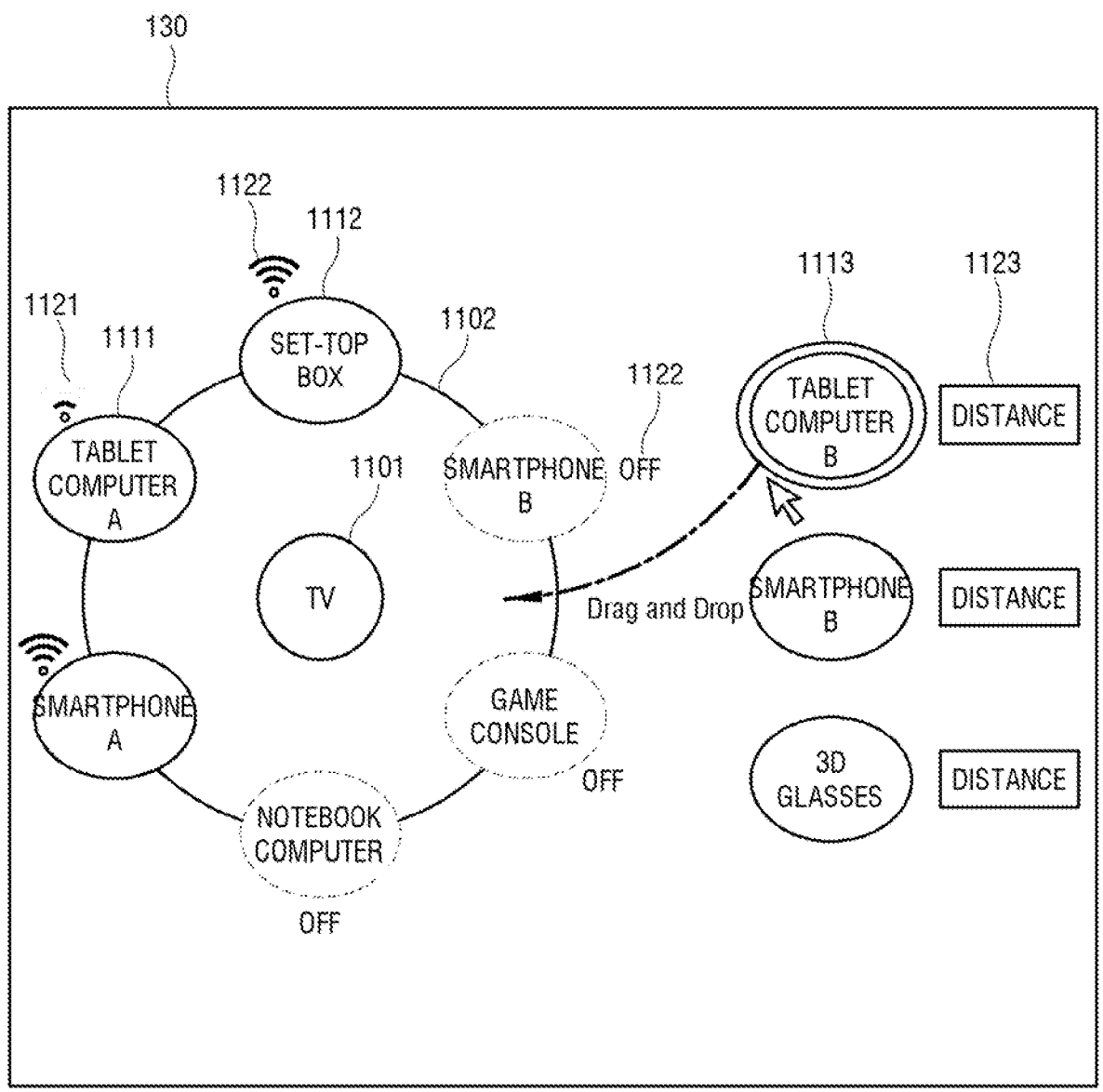
FIG. 11 illustrates a UI displayed by a display apparatus according to still another embodiment of the disclosure.

FIG. 11 illustrates a UI displayed by a display apparatus according to still another embodiment of the disclosure.

In the embodiment described with reference to FIGS. 4 to 7 and the embodiment described with reference to FIGS. 8 to 9, the relationship between the display apparatus 100 and the (connected) external apparatuses 200 is displayed as a radially schematized UI. However, the UI according to the disclosure is not limited to the radial pattern as long as it is possible to grasp at a glance a connection relationship between the display apparatus 100 and the external apparatuses 200 centering around the display apparatus, i.e. the TV.

As shown in FIG. 11, the UI may be displayed with objects corresponding to a plurality of external apparatuses 200, i.e. second items 1111 and 1112 arranged in a circle 1102 centering around a first item 1101 corresponding to the display apparatus 100. Of course, the pattern of using the circle 1102 of FIG. 11 is merely an example, and the disclosure may include any UI as long as it provides a screen on the display 130 through which a user can check the connection status of the external apparatus 200.

Referring to FIG. 11, the controller 170 may display the status information of the connected external apparatus 200 in the form of an icon 1121 or 1122 or a text 1123. A user may check that the network connection status of the external apparatus, i.e. the tablet computer A corresponding to the item 1111 is bad through the icon 1121, and check that the network connection status of the external apparatus, i.e. the set-top box corresponding to the item 1112 is good through the icon 1122. Further, it is possible to check through the text 1123 whether the connected external apparatuses are turned on/off. Alternatively, the UI of the disclosure may include a text of 'good' or 'bad' which represents the network connection status.

Further, as shown in FIG. 11, the UI may further include a message 1123 showing the location information about the external apparatuses disconnected from the display apparatus 100, i.e. the connectable external apparatuses. The location information may include distance information. With the shown distance information about such connectable external apparatuses, a user can easily determine the actual external apparatus. The method of obtaining the location information is the same as described above with reference to FIG. 6.

According to an embodiment, referring to FIG. 11, the controller 170 may receive a user input for moving the second item 1113 of the disconnected external apparatus, i.e. the tablet computer B close to the first item 1101, i.e. toward the inside of the circle 1102 through the user input receiver 140, as the user input for the second item described in the operation 303 of FIG. 3. In response to this user input, the controller 170 may control the communicator 150 so that the external apparatus, i.e. the tablet computer B of the moved second item 1113 can be connected to the display apparatus 100. Here, the user input for moving the second item 1113 toward the inside of the circuit 1102 centering on the first item 1101 may include Drag or Drag and Drop. The procedure of setting the connection of the external apparatus through the communicator 150 is the same as those of the embodiments described above with reference to FIGS. 4 to 6.

Figure 12:
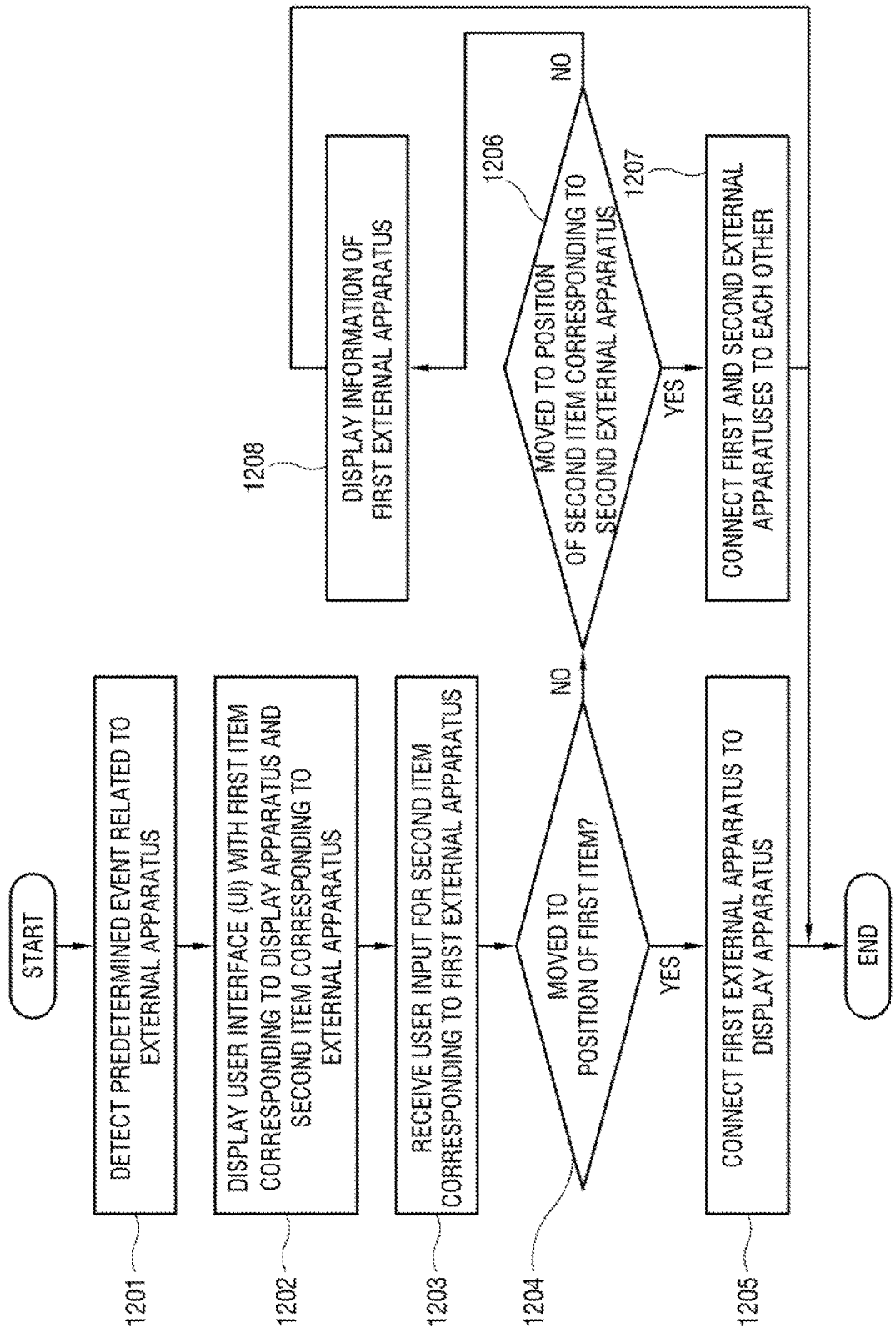
FIG. 12 is a flowchart showing a method of controlling a display apparatus according to another embodiment of the disclosure.
Figure 13:
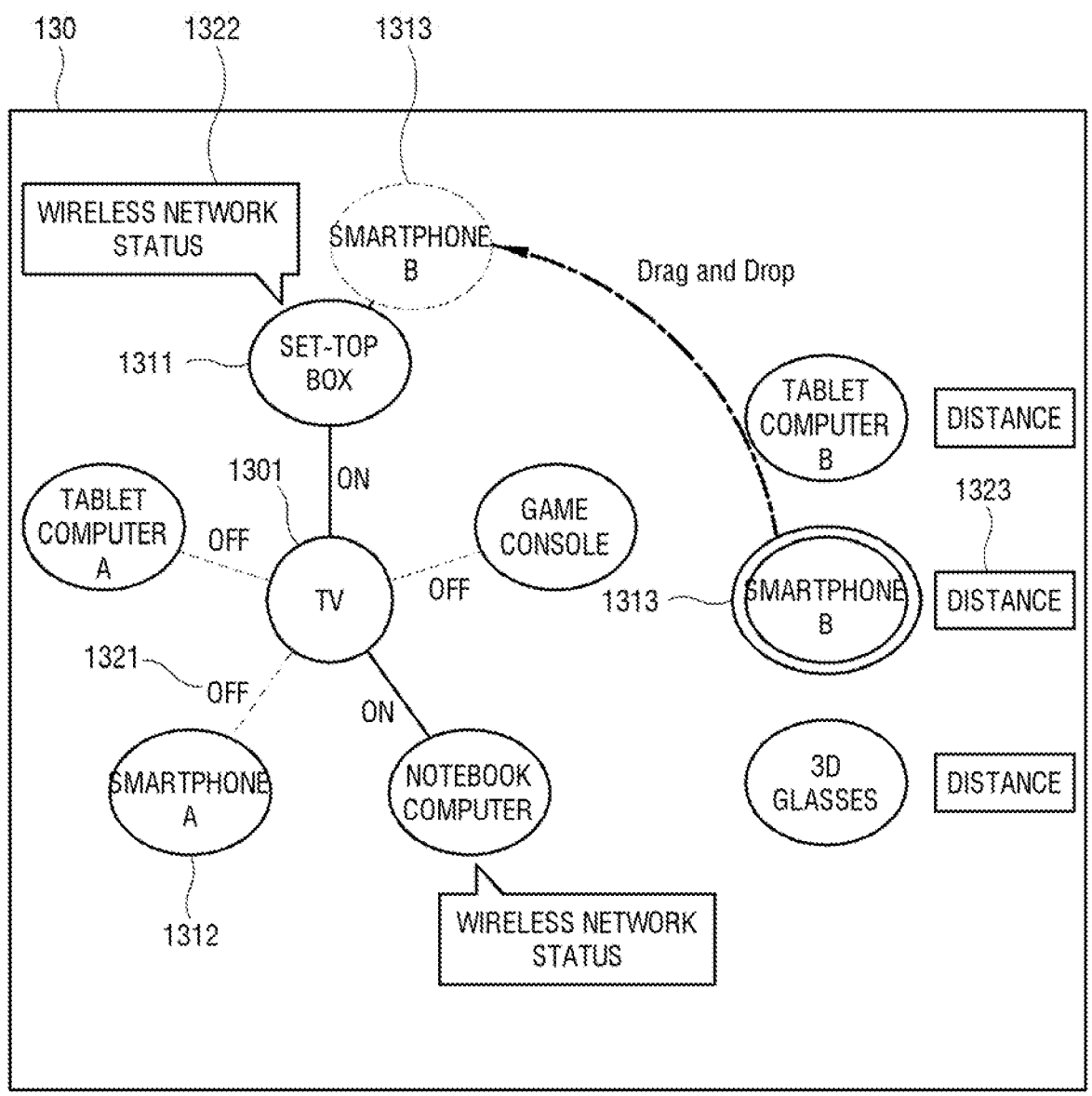
FIG. 13 illustrates a UI displayed by the display apparatus according to the embodiment shown in FIG. 12.

FIG. 12 is a flowchart showing a method of controlling a display apparatus according to another embodiment of the disclosure, and FIG. 13 illustrates a UI displayed by the display apparatus according to the embodiment shown in FIG. 12.

In the embodiment of FIG. 12, when a user input is made to move a second item corresponding a predetermined external apparatus, the external apparatus of the corresponding item is controlled to be connected to the display apparatus 100 or another external apparatus.

As shown in FIG. 12, the display apparatus 100 detects a predetermined event related to the external apparatus (1201). The event may occur based on a user input, or may automatically occur under a preset condition. For example, the event may occur based on a user input of selecting a menu related to the external apparatus of the display apparatus 100, i.e. an external input menu, a network status change in the display apparatus 100, detection of a new connectable external apparatus, and other predetermined conditions set by a user, a manufacturer, a broadcasting service provider, etc.

In response to the event in the operation 1201, the controller 170 of the display apparatus 100 controls the display 130 to display a UI which includes a first item 1301 corresponding to the display apparatus 100 and second items 1311, 1312 and 1313 corresponding to the external apparatuses 200 as shown in FIG. 13 (1202).

The UI is displayed to distinguish between the second item 1313 of the external apparatus disconnected from the display apparatus, i.e. the smartphone B and the second items 1311 and 1312 of the external apparatuses connected to the display apparatus, i.e. the set-top box and the smartphone A. For example, as shown in FIG. 13, the second items 1311 and 1312 of the connected external apparatus, i.e. the set-top box and the smartphone A are displayed adjacent to the first item 1301, but the second item 1303 corresponding to the disconnected external apparatus, i.e. the smartphone B is displayed farther from the first item 1301 than the items of the connected apparatuses. As an example of the UI according to the disclosure, the second items 1311 and 1312 of the connected external apparatus are arranged radially from the first item 1301. The UI may further display a text 1323 or the like showing distance information as the status information of the disconnected external apparatus.

Further, in terms of displaying the second items of the connected external apparatuses, the UI distinguishably shows whether the corresponding external apparatus is being currently connected or has been connected before. For example, as shown in FIG. 13, the second item 1311 corresponding to the external apparatus that is being currently connected, i.e. the set-top box is displayed as connected to the first item 1301 with a solid line, but the second item 1312 of the external apparatus that has been connected before, i.e. the smartphone A is displayed as connected to the first item 1301 with a dotted line. Here, the solid line and the dotted line are merely examples, and the external apparatus that is being currently connected and the external apparatus that has been connected before may be distinguishably displayed by various methods according to the disclosure.

Referring to FIGS. 12 and 13, the controller 170 may receive a user input for the second item 1313 corresponding to a first disconnected external apparatus, i.e. the smartphone B (1203). Here, the received user input may for example include Drag or Drag and Drop for moving the second item 1313 to a predetermined position.

In response to the user input in the operation 1203, the controller 170 identifies whether the position to which the selected item 1313 is moved is toward the position of the first item 1301 corresponding to the display apparatus 100 (1204).

When it is identified in the operation 1204 that the selected second item 1313 is moved, i.e. dragged toward the position of the first item 1301, the controller 170 controls the communicator 150 so that the first external apparatus, i.e. the smartphone B corresponding to the second item 1313 can be connected to the display apparatus 100. The connection with the display apparatus 100 based on such a dragging input is set as described above in the embodiment shown in FIG. 8.

When it is identified in the operation 1204 that the selected second item 1313 is not moved toward the position of the first item 1301, the controller 170 identifies whether the position to which the corresponding item 1313 is moved is toward the position of the second item 1311 corresponding to another external apparatus, i.e. a second external apparatus (1206). FIG. 13 illustrates that the second external apparatus is the set-top box by way of example.

When it is identified in the operation 1206 that the selected second item 1313 is moved, i.e. dragged toward the position of the second item 1311 corresponding to the second external apparatus as shown in FIG. 13, the controller 170 controls the first external apparatus, i.e. the smartphone B corresponding to the second item 1313 to be connected to the second external apparatus, i.e. the set-top box corresponding to the second item 1311 (1207). Thus, the external apparatus connected to the display apparatus 100, i.e. the set-top box and the disconnected (i.e. connectable) external apparatus, i.e. the smartphone B are connected to each other. Here, the connection between the first and second external apparatuses is set as described in the embodiment of FIG. 7. When the connection between the first and second external apparatuses is completed, the controller 170 renews the display of the display 130 to reflect this connection and display that the second items corresponding to the first and second external apparatuses are repositioned and the two second items 1311 and 1313 are connected to each other.

When it is identified in the operation 1206 that the selected second item 1313 is not moved toward the position of the second item 1311 corresponding to the second external apparatus as shown in FIG. 13, the controller 170 controls the display 130 to display the information about the first external apparatus of the second item 1313 selected in the operation 1203 (1208). Here, the displayed information may include the location information, kind, model name, user, major functions, etc. of the first external apparatus.

In the operation 1207, the second item of the disconnected external apparatus is moved toward the second item of the connected second item, and thus the connection between the external apparatuses is carried out. However, the connection between the external apparatuses according to the disclosure is not limited to this embodiment. For example, according to an embodiment of the disclosure, the connection between the external apparatuses may be carried out by a user input for moving, i.e. dragging the second item of the external apparatus of the connected apparatus toward the second item of the disconnected external apparatus. Besides the Drag input, various user inputs for the UI may be used in carrying out the connection between the external apparatuses.

Meanwhile, when a user selects, i.e. clicks the second item 1313 corresponding to the disconnected external apparatus, e.g. the smartphone B on the screen shown in FIG. 13, the display apparatus 100 may display an external apparatus connectable to the corresponding external apparatus (e.g. the smartphone B) and an external apparatus unconnectable to the corresponding external apparatus (e.g. the smartphone B) to be distinguished from each other. For example, when the set-top box among the apparatuses connected to the display apparatus 100 is connectable to the smartphone B, but the smartphone A is unconnectable to the smartphone B, the second item 1311 corresponding to the set-top box may be vividly displayed and the second item 1312 corresponding to the smartphone A may be displayed with tone-downed color like gray. Here, the tone-downed color used to distinguish between the second items 1311 and 1312 is merely an example. Alternatively, two items 1311 and 1312 may be distinguished by various methods such as a shape, an animation effect, etc.

Further, when the external apparatuses, i.e. the set-top box and the smartphone B are connected in FIG. 13, the display apparatus 100 may further show a user a UI, which includes information about a service usable by a user, for example, music or moving picture play, phone call, data transmission, etc.

Figure 14:
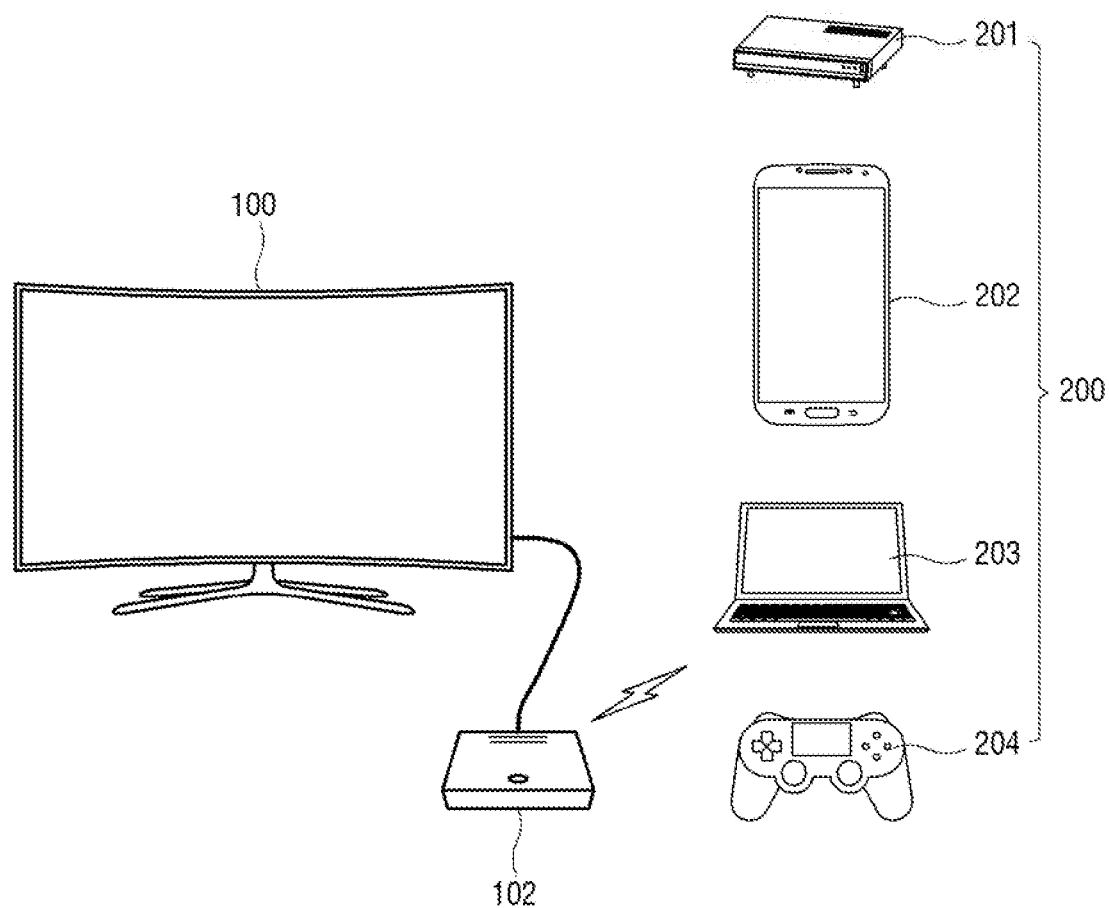
FIG. 14 illustrates a display system according to another embodiment of the disclosure.

FIG. 14 illustrates a display system according to another embodiment of the disclosure.

As shown in FIG. 14, a display system according to this embodiment of the disclosure includes a hub apparatus 102 in addition to the display apparatus 100 and at least one external apparatus 200, and the display apparatus 101 performs communication with the external apparatus 200 through the hub apparatus 102.

Therefore, elements in the system according to this embodiment of the disclosure, which perform the same operations as those of the display system according the embodiment described with reference to FIG. 1, will be called by the same names, and repetitive descriptions will be avoided.

The hub apparatus 102 shown in FIG. 14 is connected to the display apparatus 100. FIG. 14 illustrates that the display apparatus 101 and the hub apparatus 102 are connected by a wire, but the disclosure is not limited to this embodiment. Alternatively, the hub apparatus 102 may be wirelessly connected to the display apparatus 100.

In the embodiment shown in FIG. 14, the hub apparatus 102 includes the corresponding elements, which perform the same operations as the communicator 150, the storage 160 and the controller 170 of the display apparatus 100 according to the foregoing embodiment described with reference to FIG. 2. In other words, the operation of displaying the UI on the screen of the display apparatus 100 according to the foregoing embodiment, and various operations based on a user's selection to the displayed UI are performed by the controller of the hub apparatus 102. To perform such operations, data communication is carried out between the display apparatus 100 and the hub apparatus 102. The display apparatus 100 displays various UIs as shown in the accompanying drawings, and is controlled by the hub apparatus 102 so that the operations based on a user's selection to the displayed UI can be performed.

Specifically, the hub apparatus 102 detects a predetermined event related to an external apparatus, searches for an external apparatus connectable to the external apparatus connected through its own communicator, and controls the UI to be displayed on the display apparatus 100 to distinguish between the connected external apparatus and the connectable external apparatus. The event may automatically occur based on a user input or under a preset condition as described above, and may be detected by at least one of the hub apparatus 102 or the display apparatus 100.

The displayed UI includes the first item corresponding to the display apparatus 100, and the second item corresponding to at least one external apparatus. In the embodiment shown in FIG. 14, the display apparatus 100 performs all the communication operations with the outside through the hub apparatus 102, and therefore the first item may substantially represent the hub apparatus 102 even though the UI displays the first item as the display apparatus 100.

Further, when a user input is made to select one of at least one second item, the hub apparatus 102 controls the external apparatus corresponding to the selected item to be connected to or disconnected from the hub apparatus 102. For example, when the hub apparatus 102 includes a module for short-range communication such as Bluetooth as the communicator, the hub apparatus 102 transmits its own identification information (e.g. MAC address) to the external apparatus to be targeted for the communication, and receives and stores the identification information from the corresponding external apparatus, thereby setting the connection between them. A procedure of setting the connection may include password input, certificate transmission/reception, and the like security authentication.

The hub apparatus 102 of FIG. 14 is configured to store information for communication with the external apparatus 200 in its own storage. The hub apparatus 102 may further store information about a communication history. The communication history information includes information about the connected external apparatus. The connected external apparatus includes not only an external apparatus which is currently transmitting and receiving data through the hub apparatus 102, but also an external apparatus which has been connected to the hub apparatus 102 before more than once. In other words, the hub apparatus 102 is configured to store the information about the currently or previously connected external apparatus 200 as information about a registered apparatus. The information about the registered apparatus, stored in the hub apparatus 102, may include the identification information (e.g. the MAC address or the like), user account information, model name, connection date/time, and/or connection times, most-used functions, etc. of the corresponding external apparatus.

According to an embodiment, the hub apparatus 102 may serve as a relay, i.e. a so-called AP for communication between the plurality of external apparatuses. To this end, the storage provided in the hub apparatus 102 is configured to store and manage identification information (e.g. a MAC address or an IP address) of each individual external apparatus, and provide the stored identification information of an external apparatus to another external apparatus which is going to communicate with the external apparatus. Therefore, even in the embodiment of FIG. 14, the connection between the external apparatuses is carried out by the hub apparatus 102.

According to various embodiments of the disclosure as described above, an external apparatus connected to the display apparatus 100 and an external apparatus disconnected from the display apparatus 100 are displayed centering around the display apparatus as the center of the network so as to be grasped at a glance, and therefore an easy user input is enough to control the display apparatus to set or release not only connection between the external apparatus and the display apparatus but also connection between the external apparatuses.

Although a few exemplary embodiments have been shown and described, it will be appreciated that changes may be made in these exemplary embodiments without departing from the scope defined in the appended claims.

The invention claimed is:
1. A display apparatus comprising:
a display;
a communicator configured to communicate with a plurality of external apparatuses;
a storage configured to store communication history information associated with the plurality of external apparatuses; and
a processor configured to:
based on the communication history information, control a user interface (UI) to be displayed on the display, the UI comprising a first item corresponding to the display apparatus, a second item corresponding to a connected external apparatus that is connected to the display apparatus, and a second item corresponding to a connectable external apparatus that is disconnected from the display apparatus, the connectable external apparatus corresponding to a new apparatus found through a search as an external apparatus that is not currently connected and has not been connected to the display apparatus, wherein the UI distinguishably displays the second item corresponding to the connected external apparatus and the second item corresponding to the connectable external apparatus, and wherein the UI shows whether the connected external apparatus is turned on and currently connected or has been connected before and is currently turned off;
based on the second item corresponding to the connected external apparatus being selected in the UI, control the connected external apparatus to be disconnected from the display apparatus through the communicator; and
based on the second item corresponding to the connectable external apparatus being selected in the UI, control the connectable external apparatus to be connected to the display apparatus through the communicator,
wherein the processor is further configured to display the UI further comprising a first message showing whether the connected external apparatus is turned on and currently connected or has been connected before and currently turned off, a second message showing network status information of the connected external apparatus, and a third message showing a distance information of the connectable external apparatus with respect to the display apparatus.
2. The display apparatus according to claim 1, wherein the UI is displayed to position the second item corresponding to the connected external apparatus adjacent to the first item.

3. The display apparatus according to claim 1, wherein the UI is displayed to position the second item corresponding to the connectable external apparatus farther from the first item than the second item corresponding to the connected external apparatus.

4. The display apparatus according to claim 1, wherein the processor is further configured to:
- based on a user input for moving the second item corresponding to the connectable external apparatus close to the first item, control the connectable external apparatus of the moved second item corresponding to the connectable external apparatus to be connected to the display apparatus; and
- based on a user input for moving the second item corresponding to the connected external apparatus away from the first item, control the connected external apparatus of the moved second item corresponding to the connected external apparatus to be disconnected from the display apparatus.

5. The display apparatus according to claim 4, wherein the processor is further configured to:
- based on a user input for moving the second item corresponding to the connectable external apparatus to the second item corresponding to the connected external apparatus, or moving the second item corresponding to the connected external apparatus to the second item corresponding to the connectable external apparatus, control the connectable external apparatus to be connected to the display apparatus, and the connected external apparatus to be disconnected from the display apparatus.

6. The display apparatus according to claim 1, wherein the UI is displayed with second items corresponding to connected external apparatuses being distinguishable from a corresponding external apparatus that is being currently connected and a corresponding external apparatus that has been connected before.

7. The display apparatus according to claim 1, wherein the UI is displayed with the second item to respectively represent a position of the plurality of external apparatuses with respect to the display apparatus.

8. The display apparatus according to claim 1, wherein the UI is displayed with a plurality of second items respectively corresponding to the plurality of external apparatuses to distinguish between connection and disconnection between the plurality of external apparatuses.

9. The display apparatus according to claim 8, wherein, based on a user input for moving second items corresponding to first and second external apparatuses close to each other, the processor is further configured to control the first external apparatus and the second external apparatus to be connected to each other.

10. A method of controlling a display apparatus, comprising:
- detecting a predetermined event related to at least one from among a plurality of external apparatuses capable of communicating with the display apparatus;
- based on communication history information associated with the plurality of external apparatuses, displaying a user interface (UI) with a first item corresponding to the display apparatus, a second item corresponding to a connected external apparatus that is connected to the display apparatus, and a second item corresponding to a connectable external apparatus that is disconnected from the display apparatus, the connectable external apparatus corresponding to a new apparatus found through a search as an external apparatus that is not currently and has not been connected to the display apparatus, wherein the UI distinguishably displays the second item corresponding to the connected external apparatus and the second item corresponding to the connectable external apparatus, based on the event, and wherein the UI comprises a first message showing whether the connected external apparatus is turned on and currently connected or has been connected before and is currently turned off, a second message showing network status information of the connected external apparatus, and a third message showing a distance information of the connectable external apparatus with respect to the display apparatus;
- based on the second item corresponding to the connected external apparatus being selected in the UI, controlling the connected external apparatus to be disconnected from the display apparatus; and
- based on the second item corresponding to the connectable external apparatus being selected in the UI, controlling the connectable external apparatus to be connected to the display apparatus.

11. The method according to claim 10, wherein the UI is displayed:
- to position the second item corresponding to the connected external apparatus adjacent to the first item, and
- to position the second item corresponding to the connectable external apparatus farther from the first item than the second item corresponding to the connected external apparatus.

12. The method according to claim 10, further comprising:
- based on a user input for moving the second item corresponding to the connectable external apparatus close to the first item, controlling the connectable external apparatus of the moved second item corresponding to the connectable external apparatus to be connected to the display apparatus; and
- based on a user input for moving the second item corresponding to the connected external apparatus away from the first item, controlling the connected external apparatus of the moved second item corresponding to the connected external apparatus to be disconnected from the display apparatus.

13. The method according to claim 12, further comprising:
- based on a user input for moving the second item corresponding to the connectable external apparatus to the second item corresponding to the connected external apparatus, or moving the second item corresponding to the connected external apparatus to the second item corresponding to the connectable external apparatus, controlling the connectable external apparatus to be connected to the display apparatus, and the connected external apparatus to be disconnected from the display apparatus.

14. The method according to claim 10, wherein the UI is displayed with second items corresponding to connected external apparatuses to distinguish between a corresponding external apparatus that is being currently connected and a corresponding external apparatus that has been connected before.

15. The method according to claim 10, wherein the UI is displayed with a plurality of second items respectively corresponding to a plurality of external apparatuses to distinguish between connection and disconnection between the plurality of external apparatuses, and the method further comprising, based on a user input for moving second items corresponding to first and second external apparatuses close to each other, controlling the first external apparatus and the second external apparatus to be connected to each other.

* * * * *